United States Patent
Chhatriwala et al.

(10) Patent No.: US 9,351,195 B2
(45) Date of Patent: May 24, 2016

(54) HANDLING INCOMPRESSIBLE DATA PACKETS ON MULTIPLE DATA FLOWS

(71) Applicant: QUALCOMM Incorporated, San Diego, CA (US)

(72) Inventors: Murtuza Taheri Chhatriwala, San Diego, CA (US); Venkata Ramanan Venkatachalam Jayaraman, Del Mar, CA (US); Rohit Kapoor, San Diego, CA (US); Srinivasa Rao Eravelli, San Diego, CA (US); Sumanth Govindappa, San Diego, CA (US); Sivaram Srivenkata Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/312,419

(22) Filed: Jun. 23, 2014

(65) Prior Publication Data

US 2015/0085876 A1 Mar. 26, 2015

Related U.S. Application Data

(60) Provisional application No. 61/881,134, filed on Sep. 23, 2013.

(51) Int. Cl.
*H04W 28/06* (2009.01)
*H04W 24/02* (2009.01)
*H04L 29/06* (2006.01)

(52) U.S. Cl.
CPC .............. *H04W 28/06* (2013.01); *H04L 69/04* (2013.01)

(58) Field of Classification Search
CPC ...... H04W 28/06; H04W 28/065; H04B 7/14; H04B 7/15; H04B 7/145; H04B 7/15507; H04B 7/15571; H04B 10/29; H04B 7/15542
See application file for complete search history.

(56) References Cited

U.S. PATENT DOCUMENTS 6,195,024 B1   2/2001  Fallon
7,420,992 B1 *  9/2008  Fang .................... H04L 12/4633
                                                370/477

(Continued)

FOREIGN PATENT DOCUMENTS

EP        2 469 793 A1    6/2012

OTHER PUBLICATIONS

International Search Report and Written Opinion—PCT/US2014/056758—ISA/EPO—Jan. 19, 2015. (8 total pages).

*Primary Examiner* — Ahmed Elallam
(74) *Attorney, Agent, or Firm* — Arent Fox LLP

(57) ABSTRACT

Methods and apparatus of compression on multiple data flows for communication between a user equipment (UE) and a serving node. The methods and apparatus include receiving multiple data flows for compression, wherein each of the multiple data flows includes a plurality of data packets, with each data packet having a data packet header and a payload. Further, the methods and apparatus include determining a compression state for each of the multiple data flows. Moreover, the methods and apparatus include performing a first compression algorithm on each of the multiple data flows determined to have a compression state set to a do-not-compress state, wherein the first compression algorithm includes compressing the data packet header of each data packet without compressing the payload of each data packet.

26 Claims, 16 Drawing Sheets

(56) References Cited

U.S. PATENT DOCUMENTS

| | | | | |
|---|---|---|---|---|
| 8,599,878 B2* | 12/2013 | Wu | H04W 28/06 | 370/392 |
| 8,867,447 B2* | 10/2014 | Kotecha | H04L 69/04 | 370/241 |
| 8,885,670 B2* | 11/2014 | Niddam | H04L 69/04 | 370/389 |
| 8,886,837 B2* | 11/2014 | Short | H04L 69/04 | 709/224 |
| 9,172,772 B2* | 10/2015 | Venkatachalam Jayaraman | H04L 69/04 | |
| 2004/0114634 A1* | 6/2004 | Liu | H04L 63/045 | 370/521 |
| 2006/0104278 A1* | 5/2006 | Chang | H04L 47/10 | 370/392 |
| 2007/0058679 A1* | 3/2007 | Pelletier | H04W 28/06 | 370/477 |
| 2008/0080559 A1* | 4/2008 | Singh | H04W 28/04 | 370/477 |
| 2008/0101220 A1* | 5/2008 | Kim | H04L 12/189 | 370/229 |
| 2010/0098109 A1* | 4/2010 | Le Pennec | H03M 7/3066 | 370/477 |
| 2011/0058474 A1* | 3/2011 | Nagapudi | H04L 45/745 | 370/235 |
| 2012/0201205 A1* | 8/2012 | Gopalakrishnan | H04L 1/1816 | 370/329 |
| 2013/0022032 A1* | 1/2013 | Taghavi Nasrabadi | H04W 28/06 | 370/338 |
| 2013/0064177 A1* | 3/2013 | Venkatachalam | H04W 80/00 | 370/328 |
| 2014/0101485 A1* | 4/2014 | Wegener | H03M 7/3068 | 714/32 |
| 2014/0233376 A1* | 8/2014 | Yu | H04W 28/06 | 370/230 |
| 2014/0369365 A1* | 12/2014 | Denio | H04L 69/16 | 370/474 |

* cited by examiner

HANDLING INCOMPRESSIBLE DATA
PACKETS ON MULTIPLE DATA FLOWS

CROSS-REFERENCE TO RELATED
APPLICATIONS

The present application for patent claims priority to Provisional Application No. 61/881,134 entitled "HANDLING INCOMPRESSIBLE FLOWS" filed Sep. 23, 2013. It is noted that the above application is assigned to the assignee hereof, and that Provisional Application No. 61/881,134 is hereby expressly incorporated by reference herein.

BACKGROUND

Aspects of the present disclosure relate generally to wireless communication systems, and more particularly, to an apparatus and method for improving the utilization of processing resources during compression of packetized data flows, thereby providing consistent service in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless communications systems, a compressor may compress data packets by utilizing a compression algorithm. In some cases, however, the compressor may attempt to compress data packets from certain flows that may not be compressible or that may provide little or no gain (e.g., reduction in packet size) from compression, thereby wasting processing resources.

Thus, improving the utilization of processing resources during compression of packet data flows is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of compression on multiple data flows for communication between a user equipment (UE) and a serving node is described. The method includes receiving multiple data flows for compression, wherein each of the multiple data flows includes a plurality of data packets, with each data packet having a data packet header and a payload. Further, the method includes determining a compression state for each of the multiple data flows. Moreover, the method includes performing a first compression algorithm on each of the multiple data flows determined to have a compression state set to a do-not-compress state, wherein the first compression algorithm includes compressing the data packet header of each data packet without compressing the payload of each data packet.

In another aspect, an apparatus of compression on multiple data flows for communication between a user equipment (UE) and a serving node is described. The apparatus includes a means for receiving multiple data flows for compression, wherein each of the multiple data flows includes a plurality of data packets, with each data packet having a data packet header and a payload. Further, the apparatus includes a means for determining a compression state for each of the multiple data flows. Moreover, the apparatus includes a means for performing a first compression algorithm on each of the multiple data flows determined to have a compression state set to a do-not-compress state, wherein the first compression algorithm includes compressing the data packet header of each data packet without compressing the payload of each data packet.

In another aspect, an apparatus for compression on multiple data flows for communication between a user equipment (UE) and a serving node is described. The apparatus includes a call processing component configured to receive multiple data flows for compression, wherein each of the multiple data flows includes a plurality of data packets, with each data packet having a data packet header and a payload. Further, the apparatus includes a determining component configured to determine a compression state for each of the multiple data flows. Moreover, the apparatus includes a compressor component configured to perform a first compression algorithm on each of the multiple data flows determined to have a compression state set to a do-not-compress state, wherein the first compression algorithm includes compressing the data packet header of each data packet without compressing the payload of each data packet.

In yet another aspect, a non-transitory computer-readable media executable by an apparatus for wireless communication for compression on multiple data flows for communication between a user equipment (UE) and a serving node is described. The computer-readable media includes code for receiving multiple data flows for compression, wherein each of the multiple data flows includes a plurality of data packets, with each data packet having a data packet header and a payload. Further, the computer-readable media includes code for determining a compression state for each of the multiple data flows. Moreover, the computer-readable media includes code for performing a first compression algorithm on each of the multiple data flows determined to have a compression state set to a do-not-compress state, wherein the first compression algorithm includes compressing the data packet header of each data packet without compressing the payload of each data packet.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As discussed above, a compressor may be used to compress data packets in a data packet flow by taking advantage of redundancies across the data packets. In doing so, the compressor may attempt to compress data packets from certain flows that may be considered incompressible. As used herein, the term "incompressible" when used relative to a data packet flow means not able to be compressed or providing less than a threshold amount of gain (e.g., reduction in packet size) from compression. Examples of types of packet data flows that may be considered incompressible include, but are not limited to, packet data flows carrying data such as encrypted traffic or video. As such, the compressor ends up spending processing resources attempting to compress data packets that provide little or no reduction in packet size. Likewise a de-compressor may also waste processing resources on attempting to decompress data packets that have not been reduced in size.

The present aspects generally relate to efficiently handling incompressible data packets on multiple data flows. Specifically, the present apparatus and methods track each data flow and have states for each flow, where the states specify if compression is on or off.

Accordingly, in some aspects, the present methods and apparatuses may provide an efficient solution, as compared to current solutions, by tracking incompressible data packets on multiple data flows in a wireless communication network in order to efficiently compress data packets.

Figure 1:
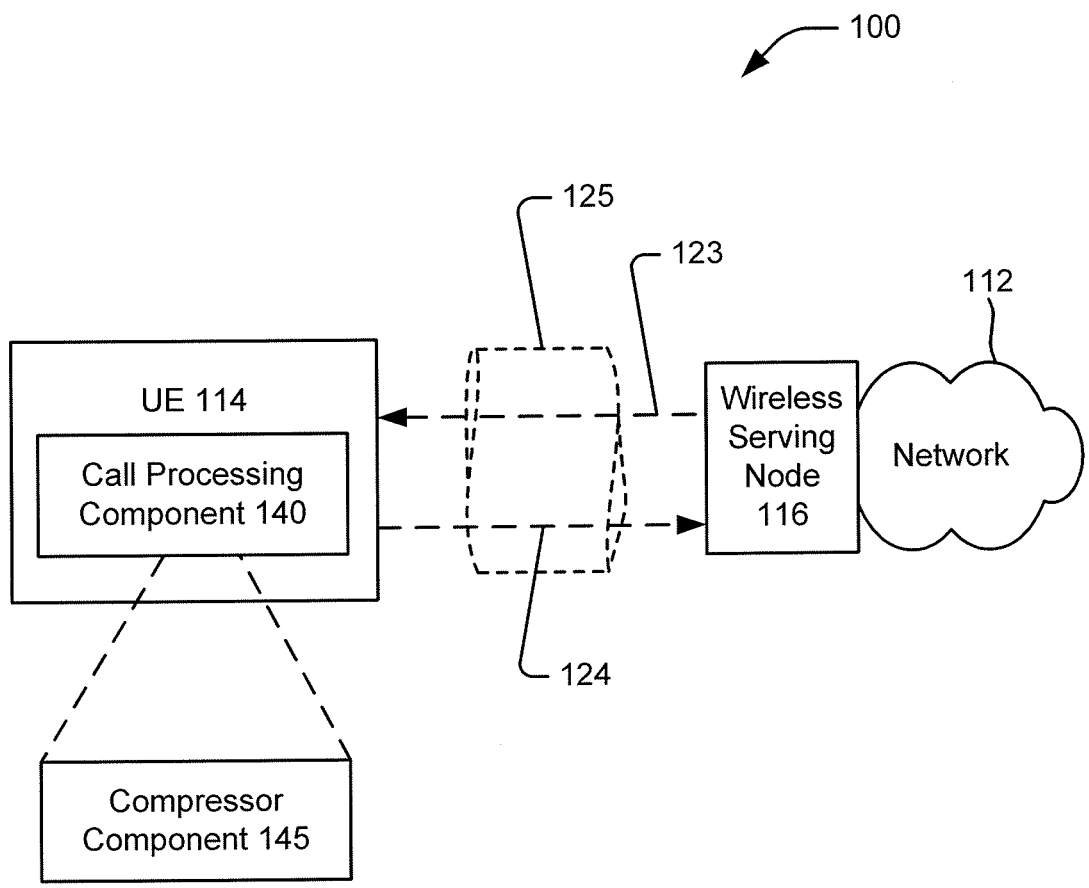
FIG. 1 is a schematic diagram of an aspect of a call processing component used in a wireless communication system.

Referring to FIG. 1, in one aspect, a wireless communication system 100 is configured to facilitate transmitting vast amount of data from a mobile device to a network, or vice versa. Wireless communication system 100 includes at least one UE (user equipment) 114 that may communicate wirelessly with one or more networks 112 via serving nodes, including, but not limited to, wireless serving node 116, over one or more wireless link 125. The one or more wireless link 125 may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data packet or a packet data flow from the UE 114 to the network 112 via wireless serving node 116.

In an aspect, UE 114 may include a call processing component 140, which may be configured to transmit data to the wireless serving node 116 over wireless link 125. For example, call processing component 140 may transmit data packets from one or more packet data flows corresponding to one or more applications executing on UE 114. For instance, the one or more applications may include one or more of a web browser application, a data call application, and a voice call application.

According to the present aspects, call processing component 140 may include a compressor component 145 configured to selectively compress or not compress one or more packet data flows based on a level of compression that may be achieved. In particular, compressor component 145 may be configured with respective threshold levels of compression that dictate enabling or disabling compression of one or more packet data flows. Moreover, in an aspect, compressor component 145 may be configured with one or more disable periods during which compression in disabled. In the aspect of more than one disable period, each disable period may have a different duration, or each disable period may have a duration based on a number of consecutive times the level of compression has failed to meet the respective threshold to enable compression. For example, in one aspect that should not be construed as limiting, compressor component 145 may be configured with the respective enable and disable thresholds, and the respective disable periods, in order to improve the efficiency of use of the processing resources for performing compression. For instance, rather than turning compressor component 145 on and off at every opportunity for a small compression gain, the present aspects may configure compressor component 145 to avoid transmitting a compressed data flow until a sufficient compression gain may be achieved, or until compressor component 145 may enable compression for a sufficient period of time until reaching the disable threshold to justify use of the processing resources for compression.

In an aspect, for example, call processing component 140 and compressor component 145 of UE 114 may be an entity operating at a protocol layer in a protocol stack of UE 114. An example protocol layer that may include an entity operating the present aspects may include, but is not limited to, a Packet Data Convergence Protocol (PDCP) layer, however, as noted, the present aspects may operate at higher or lower layers of the protocol stack.

UE 114 may include a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
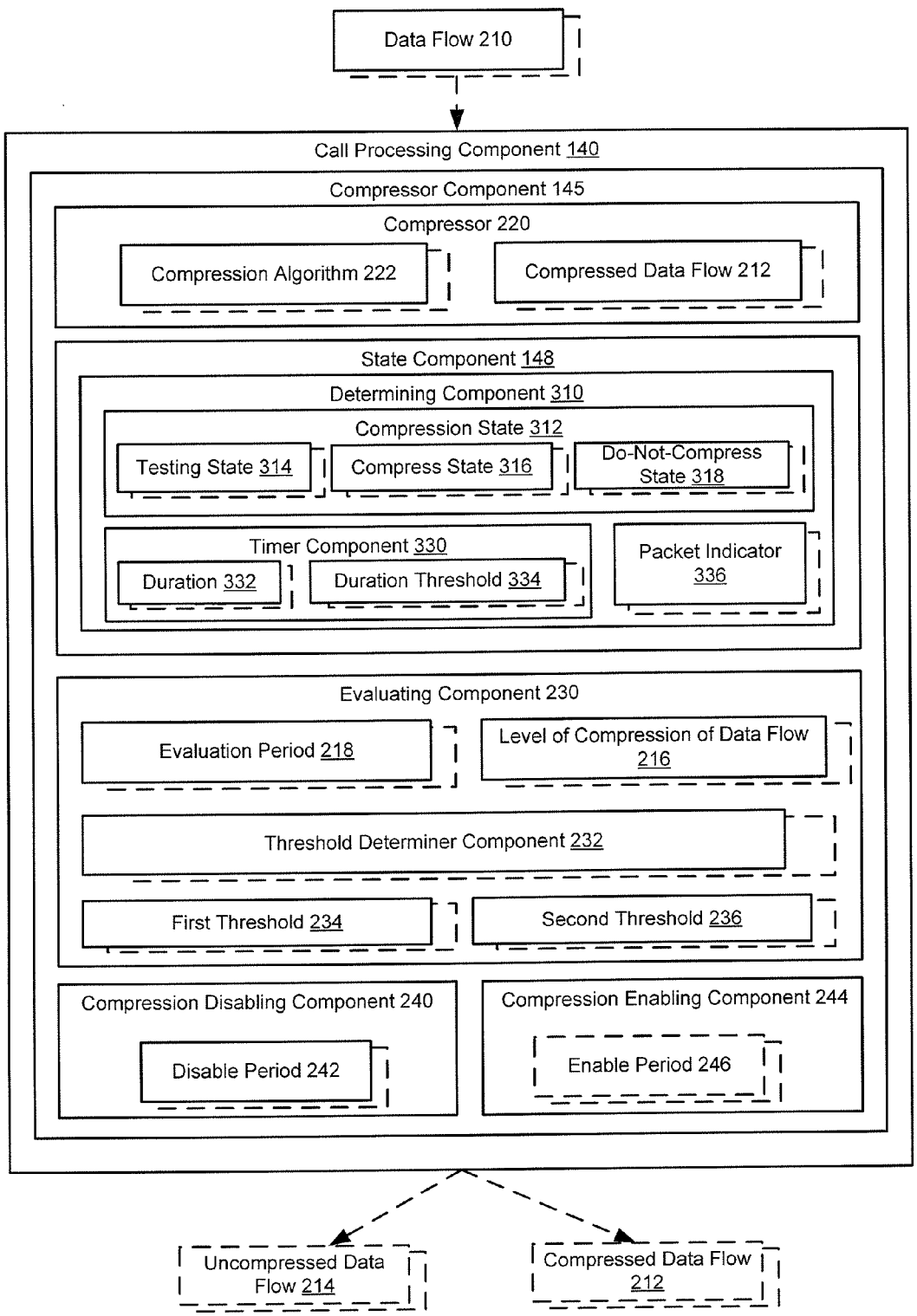
FIG. 2 is a schematic diagram of an aspect of a compressor component of the call processing component of FIG. 1.

Referring to FIG. 2, in one aspect of the present apparatus and method, compressor component 145 may include a plurality of sub-components for performing the functions of the present aspects in order to selectively generate a compressed data flow 212 or an uncompressed data flow 214 from a received data flow 210 based on a level of compression 216 that may be achieved.

In an aspect, compressor component 145 may be configured to include, among other things, a compressor 220 capable of applying a compression algorithm 222 to one or more data flows 210. For example, after compressor component 145 receives data flow 210, e.g., carrying data or signaling corresponding to an application such as a browser executing on UE 114 (FIG. 1), from a higher protocol layer, compressor 220 is configured to apply compression algorithm 222 to at least a portion of data flow 210 to generate a compressed data flow 212 having an amount of data that may be smaller than or equal to an amount of data of the corresponding portion of the original data flow 210 (which may be referred to as uncompressed data flow 214). In an example, compression algorithm 222 may be any algorithm capable of reducing a size (e.g., in bits or bytes) of a set of data packets, where, in one aspect, the reduction in size may be in the header (e.g., by eliminating repeated header information). It should be noted, however, that in other alternative or additional aspects, compression algorithm 222 may also operate to reduce a size of payload information in a set of data packets. Further, it should be noted that compressor 220 may generate compressed data flow 212 for only certain portions of data flow 210, e.g., at a number of intervals, which may include a configured number of data packets, where the intervals or number of data packets may vary depending on whether compressor component 145 has enabled or disabled compressor 220 for actually transmitting data flow 210 (as opposed to generating compressed data flow 212 for evaluation purposes). Thus, generation of compressed data flow 212 may be only for evaluation purposes, as explained below, and compressor component 145 may transmit compressed data flow 212 or uncompressed data flow 214 (e.g., original data flow 210) based on the operation of the present aspects.

It should be noted that compressor component 145 may identify data flows 210 based on source and/or destination address or port information. In an example, which should not be construed as limiting, compressor component 145 may identify data flows 210 based on one of or any combination of transmission control protocol (TCP) source port, TCP destination port, IP source address, and IP destination address for TCP based packets, and user datagram protocol (UDP) source port, UDP destination port, IP source address, and IP destination address for UDP based packets.

Further, compressor component 145 may be configured to include an evaluating component 230 capable of determining level of compression 216 of compressed data flow 212 resulting from execution of compression algorithm 222 on data flow 210, e.g., uncompressed data flow 214. For example, in an aspect, evaluating component 230 is configured to compare a size of compressed data flow 212 relative to a size of the corresponding portion of data flow 210 (or, in other words, uncompressed data flow 214) and define a metric or value related to the difference in size as level of compression 216 of data flow 210. In an alternative or additional aspect, evaluating component 230 is configured to define a metric for level of compression 216 based on a number of packets that are compressible at least a defined amount, out of a threshold number of packets. In an aspect, evaluating component 230 keeps track of level of compression 216 of data flow 210 for an evaluation period 218 (e.g., referred to below as X, where X is a positive number), which may include a configured number of data packets, and/or at intervals, where the intervals or number of data packets may vary depending on whether compressor component 145 has enabled (e.g., X=X1) or disabled (e.g., X=X2) compressor 220 for actually transmitting data flow 210 (as opposed to generating compressed data flow 212 for evaluation purposes). For example, in an aspect, evaluation period 218 may be a threshold number of past packets, and upon receiving a new packet for data flow 210, evaluating component 230 may evaluate level of compression 216 for evaluation period 218, e.g., the threshold number of past packets in data flow 210, in order to determine whether or not to compress the new packet.

In an aspect, level of compression 216 may be equivalent to one minus a sum of a payload size of the data flow, after compression, of a threshold number of past data packets (e.g., evaluation period 218, also referred to below as X, where X is a positive number) in the data flow over the sum of a payload size of the data flow, before compression, of the threshold number of past data packets in the data flow, as represented in equation 1 below. For example, if data flow 210 includes packets having sequence numbers 10 through 28, and X=3, then level of compression 216 in an initial evaluation period 218 may be computed for data packets having sequence numbers 10, 11, and 12. As noted above, the value of the threshold number of past packets (e.g., X) in the data flow of equation 1 may be dependent on whether compression is enabled (e.g., X=X1) or disabled (e.g., X=X2), as discussed below.

In another aspect, evaluating component 230 may include a threshold determiner component 232 configured to determine whether level of compression 216 meets one or more thresholds having values respectively configured to selectively disable and enable compression of data flow 210. For example, evaluating component 230 and/or threshold determiner component 232 may include a first threshold 234 (e.g., Y1 in the below equations) for disabling compression and a second threshold 236 (e.g., Y2 in the below equations) for enabling compression, where first threshold 234 has a value different from, and less than, second threshold 236. For example, in an aspect, threshold determiner component 232 compares the value of compression 216 to the value of first threshold 234 and the value of second threshold 236, e.g. to determine if level of compression 216 is below first threshold 234 to trigger disabling of compression or above second threshold 236 to trigger enabling of compression. First threshold 234 and second threshold 236 may be fixed or variable values.

In yet another aspect, compressor component 145 may be configured to include a compression enabling component 244 capable of enabling compression of data flow 210 for transmission when level of compression 216 increases above second threshold 236. For example, after threshold determiner component 232 determines that the level of compression 216 has increased above second threshold 236, then compression enabling component 244 enables compression when transmitting data flow 210. In other words, in this aspect, compressor component 145 transmits data flow 210 as compressed data flow 212 when level of compression 216 meets second threshold 236, e.g., when sufficient gains can be achieved via compressing data flow 210 relative to the cost of resources used to perform the compression. In an aspect, compression enabling component 244 may include one or more enabling periods 246 that identify an amount of time or a number of packets for which compression will be enabled. The one or more enabling periods 246 may be the same as, or different from, evaluation period 218. In other words, compression enabling component 244 may enable compression as often as level of compression 216 is evaluated by evaluating component 230, which may be on a packet-by-packet basis, or compression enabling component 244 may enable compression for a set period of time or a set number of packets without an evaluation of level of compression 216. As such, in some cases, compression enabling component 244 may continuously trigger compression as long as evaluating component 230 determines that level of compression 216 meets second threshold 236 or is greater than first threshold 234, depending on whether compression is currently disabled or enabled.

In another aspect, compressor component 145 may be configured to include a compression disabling component 240 capable of disabling compression of data flow 210 for transmission when level of compression 216 decreases below first threshold 234. For example, after threshold determiner component 232 determines that the level of compression 216 has fallen below first threshold 234, then compression disabling component 240 disables compression when transmitting data flow 210. In other words, in this aspect, compressor component 145 transmits data flow 210 as uncompressed data flow 214 when level of compression 216 meets first threshold 234, e.g., when sufficient gains cannot be achieved via compressing data flow 210 relative to the cost of resources used to perform the compression. Additionally, compression disabling component 240 may include one or more disable periods 242 (referred to as Z1 and Z2 below, where Z is a positive number) which define time periods or a number of packets for which compression should be disabled. In an aspect, compression disabling component 240 may select one of the one or more disable periods 242, for example, depending on a number of consecutive times level of compression 216 meets first threshold 234. In other words, the one or more disable periods 242 may include a plurality of disable periods each having a different time period or number of packets for which compression is disabled. For instance, when level of compression 216 meets first threshold 234 a first number of consecutive times, then compression disabling component 240 may select a first one of the one or more disable periods 242. Similarly, for instance, when level of compression 216 meets first threshold 234 a second number of consecutive times, then compression disabling component 240 may select a second one of the one or more disable periods 242, where the second one of the one or more disable periods 242 has a different value than a first one of the one or more disable periods 242. Such a different value of the second one of the one or more disable periods 242 may, in some cases, be a higher value, while in other cases the different value may be a lower value. For instance, the second one of the one or more disable periods 242 may be a higher value, for example, when it is expected that a larger number of subsequent packets may be needed before a sufficient gain can be achieved via compression.

In an alternative aspect, call processing component 140 of UE 114 (FIG. 1) may operate to receive multiple data flows 210 and compress a transmission data packet that is from one of the multiple data flows 210 to form compressed data flow 212, which is sent to call processing component 150 of wireless serving node 116 or network 112 (FIG. 1). In some instances, a data packet may be a data packet that is transmitted among a plurality of data packets in one of the multiple data flows 210. Call processing component 140 may maintain information regarding each of the multiple data flows 210 in order to efficiently handle compression operations on the data packets of each of the multiple data flows 210.

Specifically, in an aspect and referring back to FIG. 2, state component 148, located within call processing component 140 of UE 114, may track or otherwise maintain the compression state 312 for each of the multiple data flows 210, a level of compression of data flow 216 for each of the multiple data flows 210, and a packet indicator 336. For instance, as each of the multiple data flows 210 is received, call processing component 140 may be configured to cause state component 148 to determine compression state 312, level of compression of data flow 216, and packet indicator 336. In some instances, the compression state 312 may correspond to whether compressor 220 is configured to compress packets in a particular data flow 210. The level of compression of data flow 216 for each of the multiple data flows 210 may correspond to an amount (e.g., packet length) that the original data packet was reduced to. The packet indicator 336 may indicate the last time a data packet belonging to a data flow 210 was seen.

For example, state component 148 may include a determining component 310 for determining a compression state 312 for each of the multiple data flows 210. For instance, compression state 312 may comprise a testing state 314, compress state 316, and do-not-compress state 318. In an aspect, testing state 314 corresponds to a state where compressor component 145 attempts to compress data packets of each of the multiple data flows 210 for a limited duration in order to measure the level of compression of data flow 216. During compress state 316, compressor component 145 may configure compressor 220 to compress data packets of each of the multiple data flows 210 until the level of compression of data flow 216 fails to satisfy a first threshold 234. In do-not-compress state 318, compressor 220 may either not compress the data packets of each of the multiple data flows 210 or only compress the data packet headers of the data packets of each of the multiple data flows 210.

In particular, in an aspect, even though compressor component 145 may be operating in do-not-compress state 318, compressor component 145 may be configured to perform a compression algorithm 222 for each of the multiple data flows 210 based on an indication from state component 148. For example, compressor component 145 may be configured to enable compression for a data packet header of a data packet of each of the multiple data flows 210. Additionally, compressor component 145 may disable compression for a payload of the data packet of each of the multiple data flows 210. In other words, data packets transmitted on a particular data flow 210 that has a compression state 312 set to a do-not-compress state 318 may have header-only compression enabled. Further, during the compression algorithm 222, compressor component 145 may update a memory (e.g., memory 584 in FIG. 7) with the data packet header of the data packet belonging to one of the multiple data flows 210. Compressor 220 may be configured to perform a plurality of compression algorithms 222, each of which correspond with one or more multiple data flows 210.

In another aspect, state component 148 may include updating component 320, which may be configured to maintain level of compression of data flow 216 for each of the multiple data flows 210 corresponding to a level of compression. The level of compression of data flow 216 may also correspond to a filter compression percentage that is calculated based on the size (e.g., length) of the compressed data packet in relation to the size of the original uncompressed data packet. In some instances, the filter compression percentage may be a ratio of the size of the compressed data packet and the size of the original uncompressed data packet. In other instances, the level of compression of data flow 216 may be calculated based on the level of compression of the payload of each data packet. For example, during the do-not-compress state 318, evaluating component 230 may set the level of compression of data flow 216 for each of the multiple data flows 210 to a default value (e.g., a value of zero) to indicate that no compression is occurring, or to some other value that represents an amount of compression that is being obtained. In some instances, evaluating component 230 may not update the level of compression of data flow 216 during do-not-compress state 318 due to the payload not being compressed in the do-not-compress state 318.

On the other hand, during the testing state 314, compressor component 145 may perform a compression algorithm 222 on each of the multiple data flows 210 set to the testing state 314, wherein evaluating component 230 updates level of compression of data flow 216 on each of the multiple data flows 210. For example, evaluating component 230 may initialize the level of compression of data flow 216 to a default value (e.g., a value of zero). Compressor 220 may then compress one or more data packets of each of the multiple data flows 210 set to the testing state 314. As each data packet is being compressed, evaluating component 230 may update the level of compression of data flow 216 on each of the multiple data flows 210 to represent the level of compression for each data packet, or some mathematical function of the level of compression for multiple packets. In some instances, the level of compression of data flow 216 may correspond to a filter compression percentage that is calculated based on the size (e.g., length) of the compressed data packet in relation to the size of the original uncompressed data packet. In some instances, the filter compression percentage may be a ratio of the size of the compressed data packet and the size of the original uncompressed data packet. In other instances, the level of compression of data flow 216 may be calculated based on the level of compression of the payload of each data packet. Then, evaluating component 230 may be configured to compare the level of compression of data flow 216 on each of the multiple data flows 210 with a first threshold 234. In some instances, first threshold 234 may be predetermined or may be modifiable. In other instances, evaluating component 230 may compare the level of compression of data flow 216 on each of the multiple data flows 210 with the first threshold 234 when a threshold number of data packets have been compressed.

As such, evaluating component 230 may be configured to inform determining component 310 to change the compression state 312 on each of the multiple data flows 210 based on the comparison of the level of compression of data flow 216 on each of the multiple data flows 210 and the first threshold 234. For example, if the level of compression of data flow 216 on each of the multiple data flows 210 satisfies the first threshold 234 during the testing state 314 then determining component 310 may change the compression state 312 on each of the multiple data flows 210 to the compress state 316. As a result, compressor 220 may continue to compress data packets for a respective one of the multiple data flows 210 that remain in the compress state 316. In particular, compressor 220 may compress one or more data packets of one of the multiple data flows 210, and the evaluating component 230 may update the level of compression of data flow 216 on each of the multiple data flows 210 as each of their respective data packets are compressed.

During the compress state 316, evaluating component 230 may continuously or periodically compare the level of compression of data flow 216 on each of the multiple data flows 210 with the first threshold 234. Determining component 310 may then determine whether to change the compression state 312 from compress state 316 to the do-not-compress state 318 or to maintain the compress state 316 on each of the multiple data flows 210. In an instance, determining component 310 may change the compression state 312 to the do-not-compress state 318 when the level of compression of data flow 216 on any of the multiple data flows 210 does not satisfy the first threshold 234. In another instance, compressor 220 may continue to compress data packets of each of the multiple data flows 210 set to the compress state 316 when each of their respective level of compression of data flow 216 satisfies the first threshold 234.

In another example, if the level of compression of data flow 216 on any of the multiple data flows 210 fails to satisfy the first threshold 234 during the testing state 314, then determining component 310 may change their respective compression state 312 back to the do-not-compress state 318. As a result, compressor 220 may perform a compression algorithm 222 where only the data packet headers of the data packets of each of the multiple data flows 210 are compressed and the payloads of the data packets are left uncompressed.

Further, state component 148 may include timer component 330, which may be configured to maintain the duration 332 for each of the multiple data flows 210 in which compressor 220 performs the compression algorithm 222 in the do-not-compress state 318. For example, timer component 330 may be configured to determine duration 332 corresponding to an amount of time the compression state 312 is set to the do-not-compress state 318 or a number of data packets compressed during the do-not-compress state 318. Timer component 330 may maintain a duration threshold 334 for each of the multiple data flows 210, wherein the timer component 330 uses the duration threshold 334 to determine whether to change the compression state 312 on each of the multiple data flows 210. In an instance, timer component 330 may determine that duration 332 satisfies the duration threshold 334 for any of the multiple data flows 210. As a result, compressor component 145 may change the compression state 312 to testing state 314 on the respective multiple data flows 210, where compressor 220 performs a compression algorithm for each of the multiple data flows 210.

In another instance, timer component 330 may modify duration threshold 334 based on whether the level of compression of data flow 216 fails to satisfy the first threshold 234 during the testing state 314. If the level of compression of data flow 216 on each of the multiple data flows 210 fails to satisfy the first threshold 234 during the testing state 314, timer component 330 may increase the duration threshold 334. For example, timer component 330 may increase the duration threshold 334 linearly or exponential for each subsequent failure. Therefore, as duration 332 increases in value, state component 148 maintains in the do-not-compress state 318 without switching to the testing state 314 in order to prevent unnecessary performance of a compression algorithm 222 since the level of compression of data flow 216 of the particular data flow has repeatedly failed to satisfy the first threshold 234. On the other hand, when the compression state 312 changes from the testing state 314 to the compress state 316, timer component 330 may reset duration threshold 334 back its initial duration threshold value. Additionally, each time the compression state 312 changes to the do-not-compress state 318 on each of the multiple data flows 210, timer component 330 resets the duration 332 back to a default value (e.g., a value of zero).

In an alternative or additional aspect, although discussed above with reference to UE 114, the above noted functionally of call processing component 140 and compressor component 145 may be included in wireless serving node 116 and/or network 112. For example, but not limited hereto, call processing component 140 and compressor component 145 may be hardware mounted within network 112, software or computer readable media and/or firmware stored within a memory or processor of wireless serving node 116 and/or network 112.

Figure 3A:
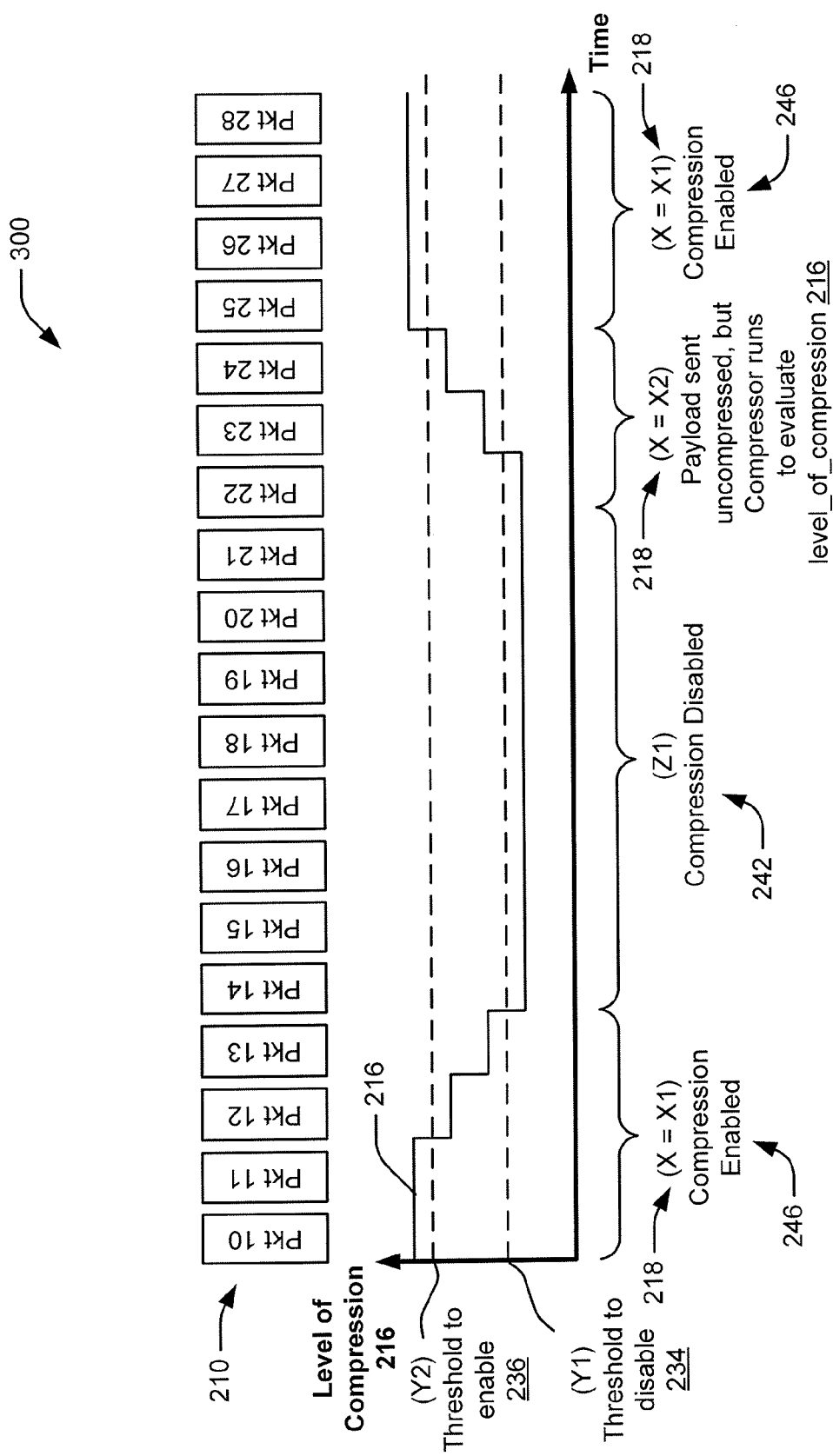
FIG. 3A is a graphical representation of an aspect of call processing in the wireless communication system of the present disclosure.

Referring to FIG. 3A, a graphical representation 300 of one aspect of the evaluation of level of compression 216 of data flow 210 and the corresponding enabling or disabling of compression when transmitting data flow 210 illustrates the operation of call processing component 140 and compressor component 145. As discussed above, compressor 220 compresses portions of data flow 210, during at least evaluation period 218, such that evaluating component 230 keeps track of level of compression 216 so that threshold determiner component 232 may trigger compression enabling component 244 or compression disabling component 240 to allow compressor component 145 to transmit compressed data flow 212 or uncompressed data flow 214.

In the example of FIG. 3A, level of compression 216 is equivalent to one minus the sum of a payload size of the data flow, after compression, over the sum of the payload size of the data flow, before compression, as represented in equation 1 below.

$$\text{level of compression} = 1 - \left( \frac{\text{total amount of data payload after compression}}{\text{total amount of data payload before compression}} \right) \quad \text{Equation (1)}$$

where, the total amount of data payload after compression is the sum of the payload size, after compression, of the past X data packets in the data flow, e.g., the threshold number of past packets or the number of packets associated with evaluation period 218. The total amount of data payload before compression is the sum of the payload size, before compression, of the past X data packets in the data flow.

As discussed above, the value of X depends on whether compression is enabled or disabled. For example, when compression is enabled by threshold determiner component 232 triggering compression enabling component 244, X may be set to X1, and when compression disabled by threshold determiner component 232 triggering compression disabling component 240, X may be set to X2. Both 1 and X2 may be fixed or variable values.

X1 and X2 may be set to different values, or in some cases, X1 and X2 may be set to the same value. For instance, in FIG. 3A, X1 is set to equal three and X2 is also set to equal three, according to one example. However, X1 and X2 may be set to any other value, based on the desired level of enabling or disabling of compression.

When level of compression 216 tracked by evaluating component 230, decreases below a threshold Y1 (e.g., first or lower threshold 234), as determined by threshold determiner component 232, compression disabling component 240 disables compression for data flow, 210 for the next Z1 packets, e.g., where Z1 corresponds to one of the one or more disable periods 242. The value of Z1 may be fixed or variable.

For example, in FIG. 3A, after data packet 13 of data flow 210, threshold determiner component 232 determines that level of compression 216 has decreased below threshold Y1, e.g., first threshold 234. Thereafter, compression disabling component 240 disables compression for data packet 14 though data packet 21 (e.g., Z1 packets or disable period 242) of data flow 210.

After the uncompressed Z1 data packets have been transmitted, compressor 220 performs compression on data flow 210 for evaluation period 218, e.g., X2 data packets or data packets 22 through 24 in this example, and at the same time, compressor component 145 transmits the corresponding X2 data packets uncompressed, e.g., as uncompressed data flow 214. Additionally, evaluating component 230 evaluates level of compression 216 of the data packets associated with evaluation period 218, e.g., the X2 data packets of data flow 210 following the transmission of uncompressed Z1 packets.

If level of compression 216 exceeds threshold Y2 (e.g., second or higher threshold 236), as determined by threshold determiner component 232, then compression enabling component 244 enables compression and compressor component 145 starts transmitting the data packets of the data flow 210, e.g., packets 25 through 28 in this example, as compressed data packets or compressed data flow 212.

Figure 3B:
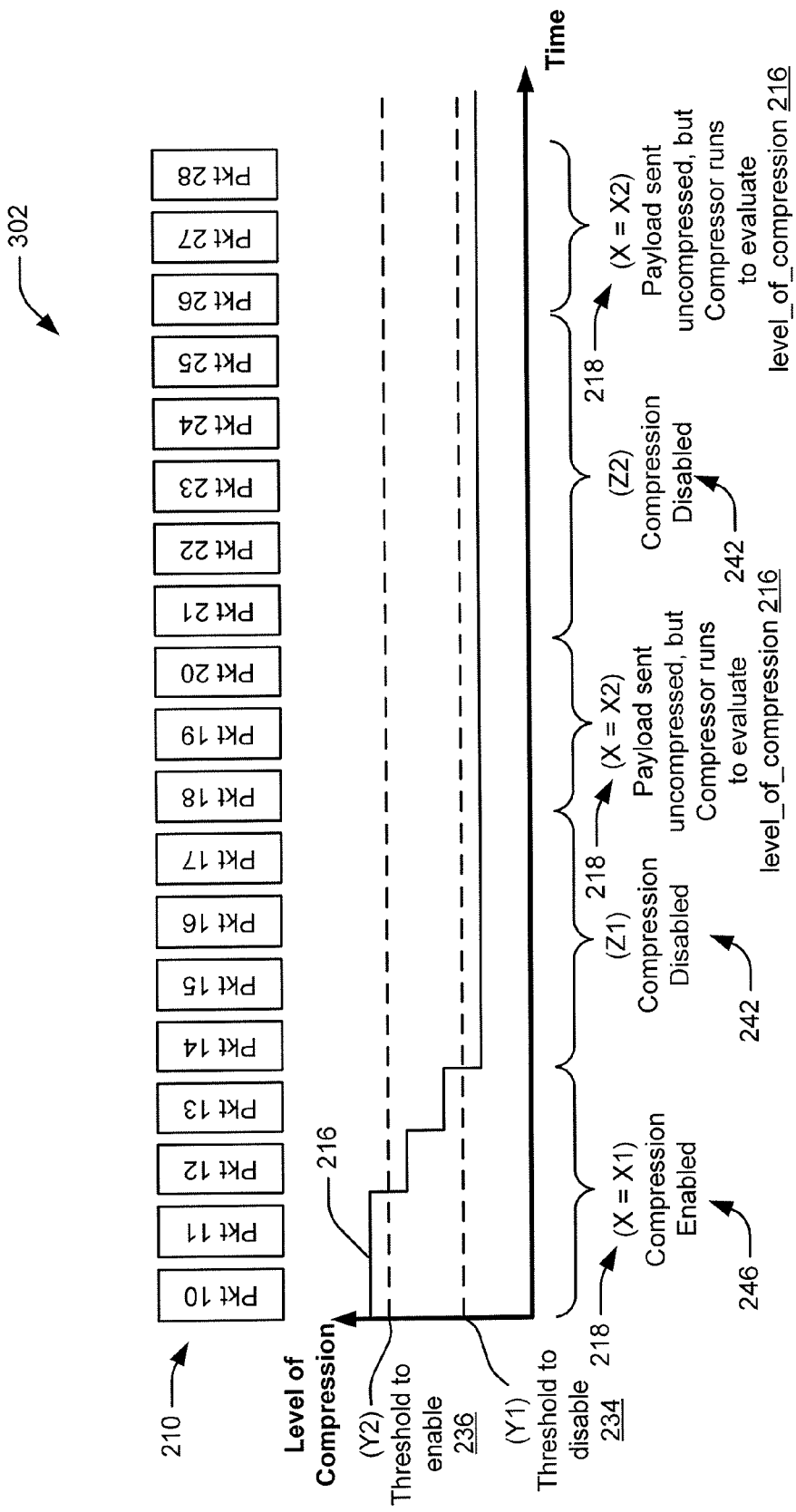
FIG. 3B is a graphical representation of other aspect of call processing in the wireless communication system of the present disclosure.

Referring to FIG. 3B, in an aspect similar to FIG. 3A, a graphical representation 302 of another aspect of the evaluation of level of compression 216 of data flow 210 and the corresponding enabling or disabling of compression when transmitting data flow 210 illustrates the operation of call processing component 140 and compressor component 145 when level of compression 216 does not exceed second threshold Y2 after disable period 242 (e.g., Z1) and subsequent evaluation period 218 (e.g., X2). In this case, compressor component 145 may initiate another disable period 242 (e.g., Z2), which may have a different length than the first disable period. Then, subsequent to the second disable period 242, compressor component 145 performs evaluation of level of compression 216 for evaluation period 218 (e.g., X2 in this example), and enables or disables compression according to the above rules.

In the aspect of FIG. 3B, after determining that level of compression 216 is still below threshold Y1, the number of data packets for which compression is disabled (Z2 or disable period 242) can be set depending how many such consecutive evaluations of level of compression 216 have failed to exceed threshold Y1. For example, in one aspect, the longer level of compression 216 stays below Y2, the larger the value of Z2 becomes.

It should be noted that though the values of X1, X2, Y1, Y2, Z1, and Z2 may be fixed or variable, and the values may also be signaled from the radio network or core network through radio resource control (RRC) signaling and/or or other messages.

It should be noted that level of compression 216 may be computed according to a variety of formulas. In another aspect, for example, level of compression 216 may be defined by the following equation:

$$\text{level of compression} = \frac{\text{Total amount of data payload before compression} - \text{Total amount of data payload after compression}}{X} \quad \text{Equation 2}$$

where X is the threshold number of past data packets over which the level of compression is computed.

In yet another aspect, level of compression 216 may be defined by the following equation:

$$\text{level of compression} = \frac{\text{Number of data packets that are compresible}}{X} \quad \text{Equation 3}$$

where the number of packets that are compressible is the number of packets out of the threshold number of past data packets, e.g., X, for which the payload size after compression is less than a K times the payload size before compression, where K is a constant value that may be determined based on the specific application.

In yet another aspect, level of compression 216 may be defined by the following equation:

$$\text{level of compression} = \frac{\text{Number of data that are compressible}}{X} \quad \text{Equation 4}$$

where the number of packets that are compressible is the number of packets out of the threshold number of past data packets, e.g., X, for which the payload size after compression is less than the payload size before compression minus K, where K is a constant value that may be determined based on the specific application.

Moreover, alternative definitions for level of compression 216 may be signaled by the radio or core network.

Figure 4:
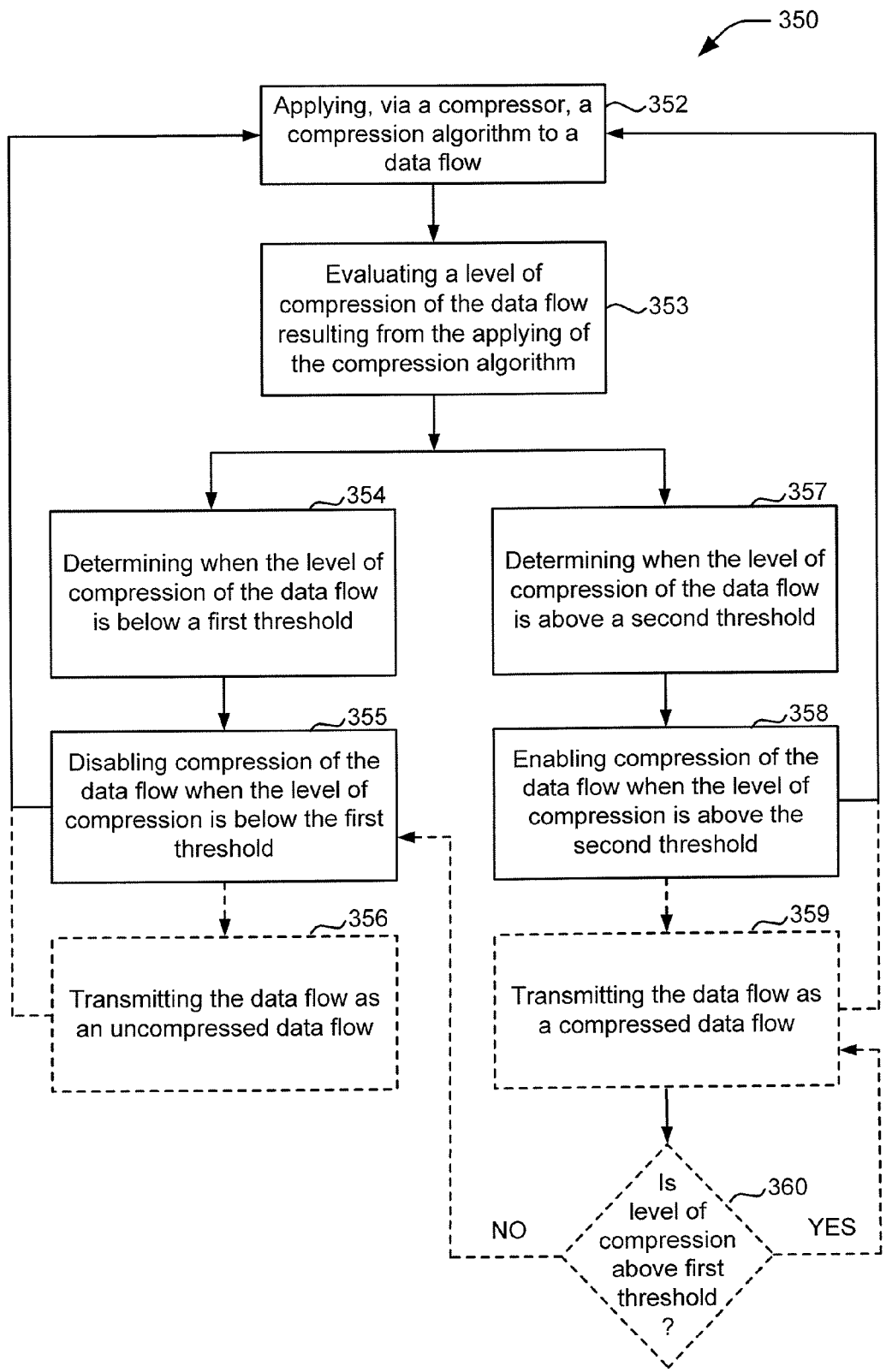
FIG. 4 is a flow diagram of one aspect of a method for call processing in the wireless communication system of the present disclosure.

Referring to FIG. 4, in one aspect, a method 350 of wireless communication may be executed, for example, by call processing component 140 and/or compressor component 145 of FIGS. 1 and 2 for selectively enabling or disabling compression of a data flow based on a level of compression that may be achieved.

At 352, method 350 may include applying, via a compressor, a compression algorithm to a data flow. As discussed above with reference to FIGS. 1, 2, 3A and 3B, call processing component 140 and/or compressor component 145 of UE 114 or wireless serving node 116 or network 112 is configured for applying compression algorithm 222 onto data flow 210 at compressor 220. For example, after UE 114 receives data flow 210 from a higher protocol layer or application, compressor 220 is configured to execute compression algorithm 222 to generate compressed data flow 212 from data flow 210. The information in compressed data flow 212 may have a size that is less than or equal to a size of the information in data flow 210, which may also be referred to as uncompressed data flow 214.

As discussed above, one or more data flow 210 may be identified based on one or based on a combination of a transmission control protocol (TCP) source port, a TCP destination port, an IP source address, or an IP destination address for TCP based packets, and a user datagram protocol (UDP) source port, a UDP destination port, an IP source address, and an IP destination address for UDP based packets.

At 353, method 350 may include evaluating a level of compression of the data flow resulting from the applying of the compression algorithm. As discussed above with reference to FIGS. 1, 2, 3A and 3B, call processing component 140 and/or compressor component 145 of UE 114 or wireless serving node 116 or network 112 is configured for evaluating level of compression 216 of data flow 210 resulting from applying of compression algorithm 222 by compressor 220. For example, compressor component 145 may include evaluating component 230 that is configured to evaluate level of compression 216 based on a difference in size between compressed data flow 212 and uncompressed data flow 214, or based on a number of packets that are compressible at least a defined amount, out of a threshold number of packets. Evaluating component 230 may evaluate level of compression 216 for any number of evaluation periods 218, which may occur upon receipt of a new packet and which may take into account a threshold number of past packets, e.g., X number of packets, which may vary from one value, e.g., X1, when compression is enabled to another value, e.g., X2, when compression is disabled, in order to determine level of compression 216. More specifically, it should be noted that, in some aspects, level of compression 216 may be evaluated according to Equations 1-4, discussed above, although level of compression 216 is not limited to these equations.

At 354, method 350 may include determining when the level of compression of the data flow is below a first threshold. As discussed above with reference to FIGS. 1, 2, 3A and 3B, call processing component 140 and/or compressor component 145 of UE 114 or wireless serving node 116 or network 112 is configured for determining when the level of compression of the data flow is below a first threshold. For example, for each evaluation period 218, compressor component 145 may execute threshold determiner component 232 to determine when level of compression 216 of data flow 210 is below first or lower threshold 234 or Y1. For instance, threshold determiner component 232 may determine that level of compression 216 of data flow 210 is below first threshold 234 or Y1 during an evaluation when compression is enabled (see 460), or during an evaluation following disable period 242 when compression is disabled. In any case, first threshold 234 or Y1 represents a value at which the gain from performing compression is not worth the cost, in terms of processing resources and/or communication overhead in transmitting compressed data flow 212.

At 355, method 350 may include disabling compression of the data flow when the level of compression decreases below the first threshold, wherein the first threshold is less than the second threshold. As discussed above with reference to FIGS. 1, 2, 3A and 3B, call processing component 140 and/or compressor component 145 of UE 114 or wireless serving node 116 or network 112 is configured for disabling compression of data flow 210 when level of compression 216 is below first threshold 234 or Y1. For example, after threshold determiner component 232 determines that level of compression 216 is below first threshold 234, e.g., during an evaluation when compression is enabled (see 460), or during an evaluation period following a disable period 242 when compression is disabled, compressor component 145 may execute compression disabling component 240 to initiate or continue disabling of compression of data flow 210. Subsequent to 355, for example after disable period 242, method 350 may return to 352 and 353 to evaluate level of compression 216 relative to first threshold 234 and second threshold 236 to determine whether to continue disabling compression or to initiate enabling of compression.

Optionally, at 356, method 350 may include transmitting the data flow as an uncompressed data flow. As discussed above with reference to FIGS. 1, 2, 3A and 3B, call processing component 140 and/or compressor component 145 of UE 114 or wireless serving node 116 or network 112 may initiate transmission of uncompressed data flow 214 or original data flow 210, e.g., via a transmitter or transceiver, or may transmit uncompressed data flow 214 to a lower protocol layer, when level of compression 216 is below first threshold 234 or Y1. Subsequent to 356, method 350 may return to 352 to perform another iteration, as noted above.

At 357, method 350 may include determining when the level of compression of the data flow is above a second threshold. As discussed above with reference to FIGS. 1, 2, 3A and 3B, call processing component 140 and/or compressor component 145 of UE 114 or wireless serving node 116 or network 112 is configured for determining when level of compression 216 of data flow 210 is above second threshold 236 or Y2. For example, for each evaluation period 218, compressor component 145 may execute threshold determiner component 232 to determine when level of compression 216 of data flow 210 is above second or higher threshold 236 or Y2. For instance, threshold determiner component 232 may determine that level of compression 216 of data flow 210 is above second threshold 236 or Y2 during an evaluation when compression is disabled, e.g., following disable period 242, however, such a determination may also be made during an evaluation when compression is enabled (although, generally, first threshold 234 for disabling compression may be considered the more relevant threshold when compression is enabled). In any case, second threshold 236 or Y2 represents a value at which the gain from performing compression is worth the cost, in terms of processing resources and/or communication overhead in transmitting compressed data flow 212.

At 358, method 300300 may include enabling compression of the data flow when the level of compression is above the second threshold, wherein the second threshold is greater than the first threshold. As discussed above with reference to FIGS. 1, 2, 3A and 3B, call processing component 140 and/or compressor component 145 of UE 114 or wireless serving node 116 or network 112 is configured for enabling compression of data flow 210 when level of compression 216 is above a second threshold 236. For example, after threshold determiner component 232 determines that level of compression 216 is above second threshold 236 or Y2, then compression enabling component 244 enables compression on data flow 210. In an aspect, compression enabling component 244 operates to enable compression on data flow 210 when level of compression 216 is above second threshold 236 or Y2 in the case where compression is disabled. In other words, once compression is disabled, e.g., level of compression 216 is below first threshold 234 or Y1, then compression enabling component 244 may not enable compression again until level of compression 216 is above second threshold 236 or Y2. As such, in the case of compression being enabled, compressor component 145 generates compressed data flow 212 for transmission. In an aspect, subsequent to 358, method 350 may return to 352 to iterate the evaluation process.

Optionally, at 359, method 350 may include transmitting the data flow as a compressed data flow. As discussed above with reference to FIGS. 1, 2, 3A and 3B, call processing component 140 and/or compressor component 145 of UE 114 or wireless serving node 116 or network 112 may initiate or transmit transmission, e.g., via a transmitter or transceiver, or may transmit compressed data flow 212 when level of compression 216 meets second threshold 236 or Y2. In an aspect, subsequent to 359, method 350 may return to 352 to iterate the evaluation process.

In an additional optional aspect, at 460, method 350 may include determining, after enabling compression, if the level of compression is above the first threshold. For example, after initially enabling compression, compression enabling component 244 continues to enable compression of data flow 210 for as long as level of compression 216 is above first threshold 234 or Y1 for disabling compression. In other words, once compression is enabled, compression enabling component 244 may continue to enable compression of data flow 210 for consecutive evaluation periods 218, which may occur upon receipt of a new packet and which may take into account level of compression 216 for a threshold number of past packets, e.g., X number of packets as long as level of compression is above first threshold 234 or Y1. If so, then method 350 may include returning to 359 to transmit the data flow as compressed data flow 212 and then iterate back to 460. If not, then method 350 may proceed to 355 and disable compression and 356 to transmit the data flow as uncompressed data flow 214 and then return to the beginning of method 350.

In an aspect, for example, method 350 may be operated by UE 114 or wireless serving node 116 or network 112 (FIGS. 1 and 2) executing the call processing component 140 and/or compressor component 145 (FIGS. 1 and 2), or respective components thereof.

Thus, aspects of this apparatus and method include improving the utilization of processing resources during compression of packet data flows.

Figure 5A:
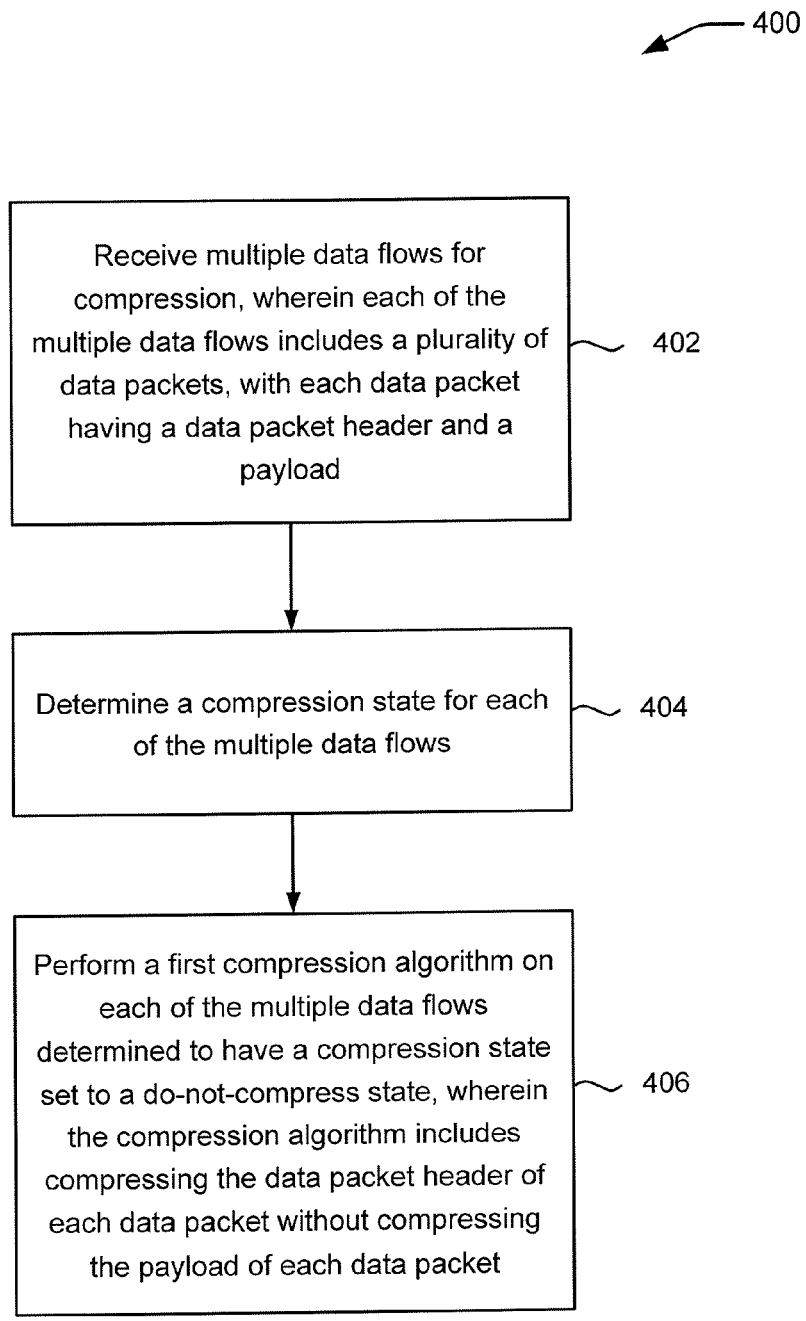
FIGS. 5A and 5B are flow diagrams illustrating exemplary methods for call processing in a wireless communication system.
Figure 5B:
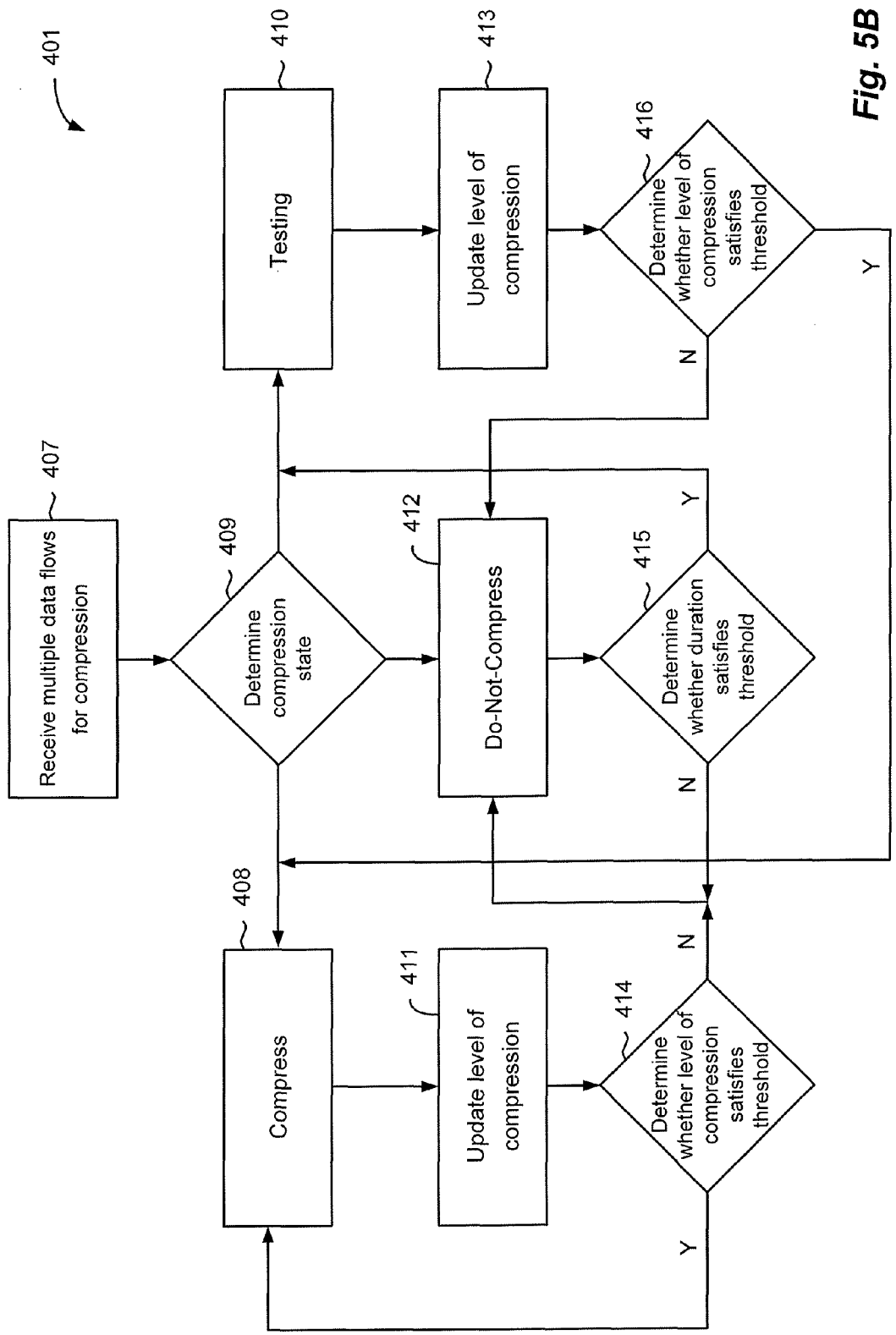

Referring to FIGS. 5A and 5B, in operation, a UE such as UE 114 (FIG. 2), or a network such as network 112 (FIG. 2) may perform one aspect of a methods 400/401 for handling incompressible data packets on multiple data flows (e.g., multiple data flows 210210 in FIG. 2). While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

Referring to FIG. 5A, in an aspect, at block 402, method 400 includes receiving multiple data flows for compression. For example, as described herein, UE 114 may execute call processing component 140 (FIG. 2) to receive multiple data flows 210 for compression. In some instances, each of the multiple data flows 210 includes a plurality of data packets, with each data packet having a data packet header and a payload.

At block 404, method 400 includes determining a compression state for each of the multiple data flows. For example, as described herein, state component 148 may execute determining component 310 (FIG. 2) to determine a compression state 312 for each of the multiple data flows 210. In some instances, compression state 312 may comprise a testing state 314, compress state 316, and do-not-compress state 318.

Further at block 406, method 400 includes performing a first compression algorithm on each of the multiple data flows determined to have a compression state set to a do-not-compress state. For example, as described herein, call processing component 140 may execute compressor component 145 (FIG. 2) to perform a first compression algorithm 222 on each of the multiple data flows 210 determined to have a compression state 312 set to a do-not-compress state 318. In some instances, the compression algorithm 222 includes compressing the data packet header of each data packet without compressing the payload of each data packet.

Referring to FIG. 5B, a more detailed aspect of the compression algorithm 222 based on the set compression state 312 (FIG. 2) is described. At block 407, method 401 includes receiving multiple data flows for compression. For example, as described herein, UE 114 may execute call processing component 140 (FIG. 2) to receive multiple data flows 210 for compression. In some instances, each of the multiple data flows 210 includes a plurality of data packets, with each data packet having a data packet header and a payload.

Further, at block 409, method 401 includes determining a compression state for each of the multiple data flows. For example, as described herein, state component 148 may execute determining component 310 (FIG. 2) to determine a compression state 312 for each of the multiple data flows 210. In some instances, compression state 312 may comprise a testing state 314, compress state 316, and do-not-compress state 318. In some instances, when the compression state 312 is determined to be set to the compress state 316, method 401 may proceed to block 408. In other instances, when the compression state 312 is determined to be set to the do-not-compress state 318, method 401 may proceed to block 412. In another instance, when the compression state 312 is determined to be set to testing state 314, method 401 may proceed to block 410.

In an aspect, at block 408, method 401 may include performing a compression algorithm 222 based on the compression state being set to the compress state. For example, as described herein, call processing component 140 may execute compressor component 145 (FIG. 2) to perform a first compression algorithm 222 on each of the multiple data flows 210 determined to have a compression state 312 set to a compress state 316.

At block 411, method 401 may include updating the level of compression on each of the multiple data flows. For example, as described herein, compressor component 145 may execute evaluating component 230 (FIG. 2) to update the level of compression 216 on each of the multiple data flows 210. In some instances, the filter compression percentage may be a ratio of the size of the compressed data packet and the size of the original uncompressed data packet. In other instances, the level of compression of data flow 216 may be calculated based on the level of compression of the payload of each data packet.

Moreover, at block 414, method 401 may include determining whether the level of compression satisfies a threshold. For example, as described herein, compressor component 145 may execute threshold determiner component 232 (FIG. 2) to determine whether the level of compression 216 on each of the multiple data flows 210 satisfy first threshold 234. If it is determined that the level of compression 216 on each of the multiple data flows 210 satisfies the first threshold 234 then method 401 returns to block 408. However, if it is determined that the level of compression 216 on each of the multiple data flows 210 fails to satisfy the first threshold 234 then method 401 may proceed to block 412.

In another aspect, at block 412, method 401 may include performing a compression based on the compression state being set to the do-not-compress state. For example, as described herein, call processing component 140 may execute compressor component 145 (FIG. 2) to perform a first compression algorithm 222 on each of the multiple data flows 210 determined to have a compression state 312 set to a do-not-compress state 318. In some instances, compressor component 145 may be configured to enable compression for a data packet header of a data packet of each of the multiple data flows 210. Additionally, compressor component 145 may disable compression for a payload of the data packet of each of the multiple data flows 210.

At block 415, method 401 may include determining whether a duration satisfies a threshold. For example, as described herein, state component 148 may execute timer component 330 (FIG. 2) to determine whether a duration 332 satisfies a duration threshold 334. In some instances, timer component 330 may maintain a duration threshold 334 for each of the multiple data flows 210, wherein the timer component 330 uses the duration threshold 334 to determine whether to change the compression state 312 on each of the multiple data flows 210. If it is determined that duration 332 fails to satisfy the duration threshold 334 then method 401 returns to block 412. However, if it is determined that duration 332 satisfies the duration threshold 334 then method 401 proceeds to block 410.

In a further aspect, at block 410, method 401 may include performing a compression based on the compression state being set to the testing state. For example, as described herein, call processing component 140 may execute compressor component 145 (FIG. 2) to perform a first compression algorithm 222 on each of the multiple data flows 210 determined to have a compression state 312 set to a testing state 314.

At block 413, method 401 may include updating the level of compression on each of the multiple data flows. For example, as described herein, compressor component 145 may execute evaluating component 230 (FIG. 2) to update the level of compression 216 on each of the multiple data flows 210. In some instances, the filter compression percentage may be a ratio of the size of the compressed data packet and the size of the original uncompressed data packet. In other instances, the level of compression of data flow 216 may be calculated based on the level of compression of the payload of each data packet.

Moreover, at block 416, method 401 may include determining whether the level of compression satisfies a threshold. For example, as described herein, compressor component 145 may execute threshold determiner component 232 (FIG. 2) to determine whether the level of compression 216 on each of the multiple data flows 210 satisfy first threshold 234. If it is determined that the level of compression 216 on each of the multiple data flows 210 satisfies the first threshold 234 then method 401 proceeds to block 408. However, if it is determined that the level of compression 216 on each of the multiple data flows 210 fails to satisfy the first threshold 234 then method 401 may proceed to block 412.

Figure 6A:
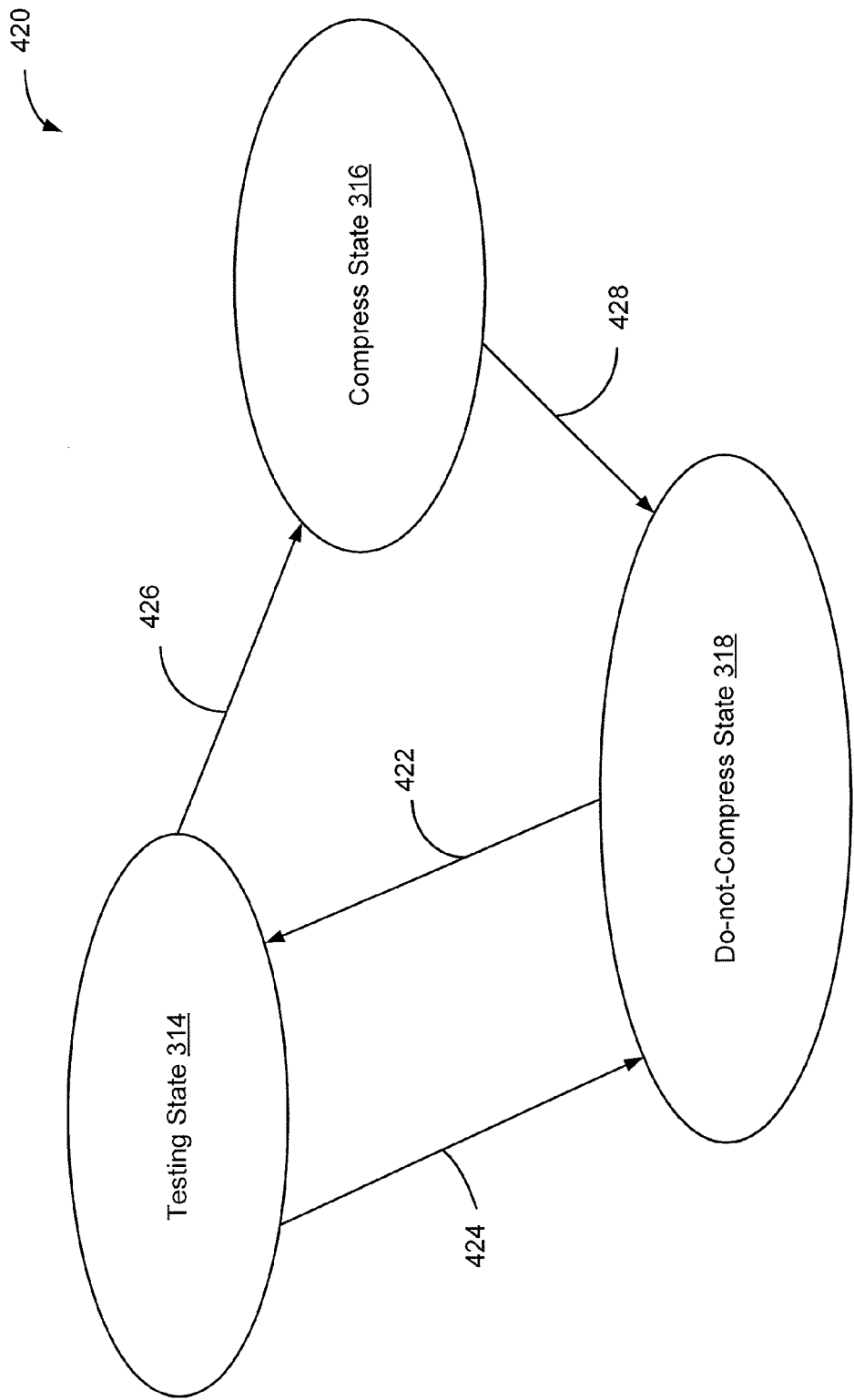
FIGS. 6A-6C are conceptual diagrams illustrating aspects of the present disclosure.
Figure 6B:
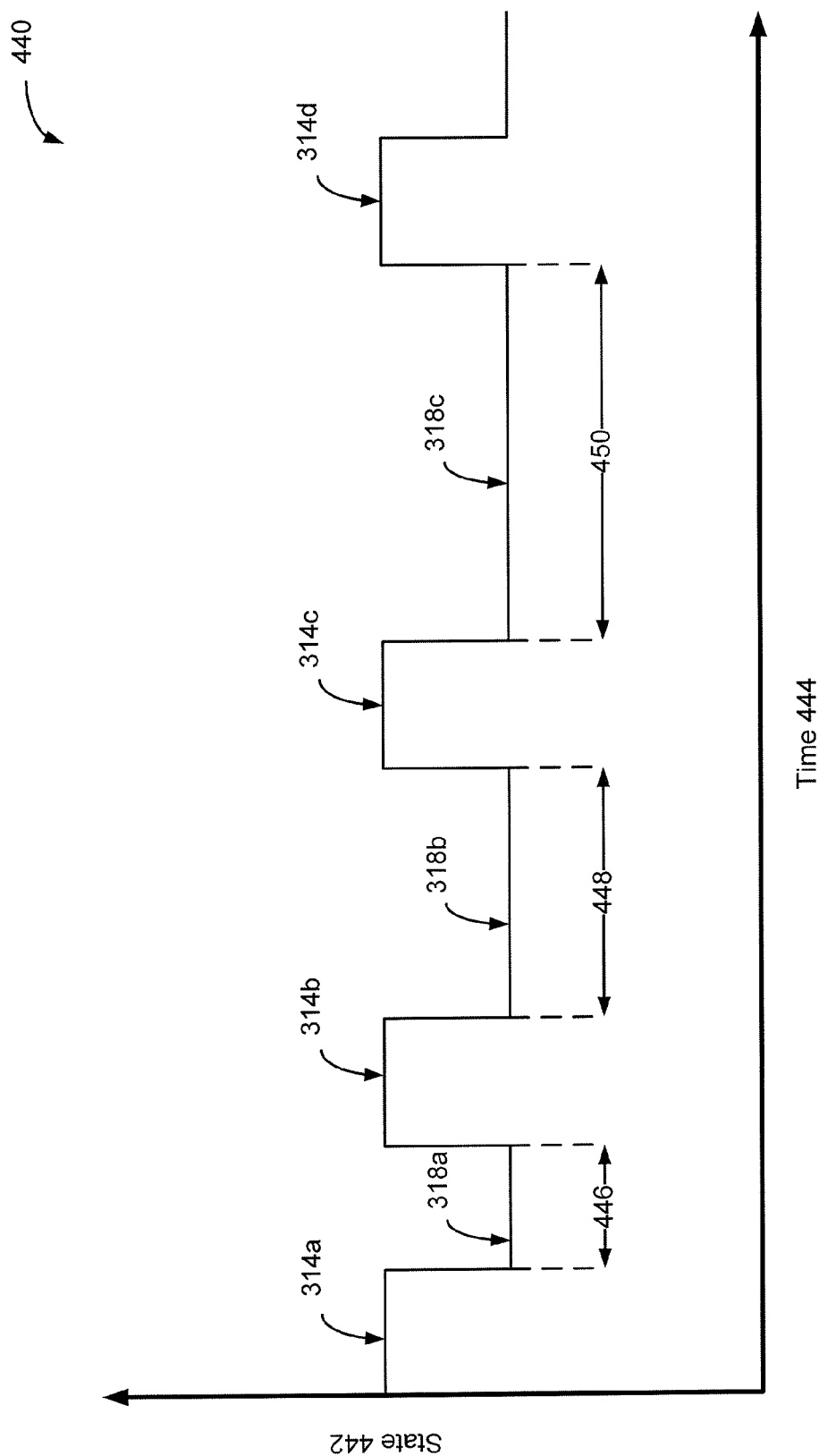
Figure 6C:
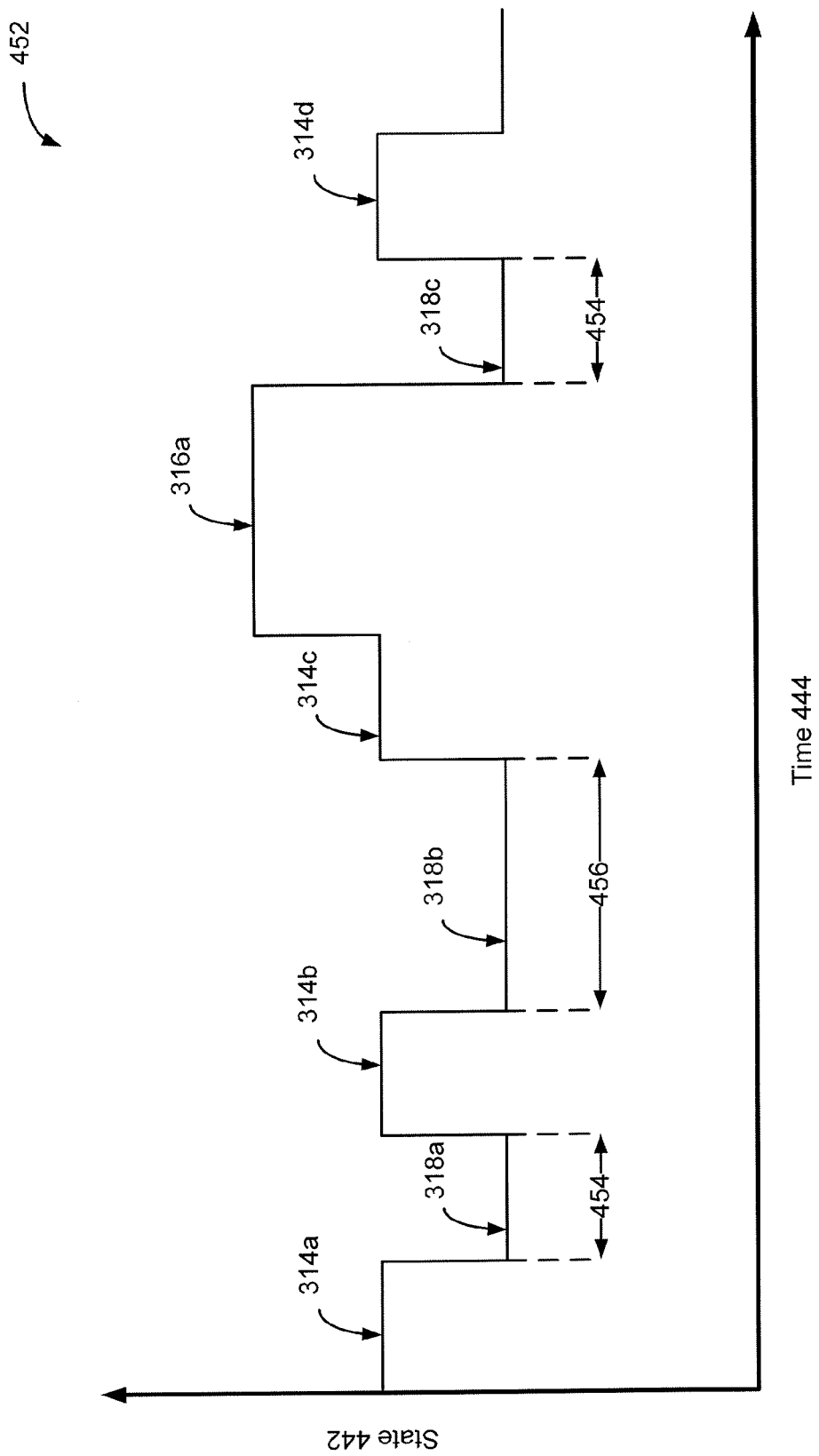

FIGS. 6A-6C are conceptual diagrams illustrating various aspects of the different compression states (e.g., compressions state 312 of FIG. 2) for each of the multiple data flows 210 (FIG. 2) of a UE 114 (FIG. 1) and/or network 112 (FIG. 1).

For example, in FIG. 6A, conceptual diagram 420 illustrates the compression states comprising testing state 314, compress state 316, and do-not-compress state 318. Further, transition arrows 422, 424, 426, and 428 correspond to the possible changes in compression state. For example, when a particular data flow out the multiple data flows 210 is in the do-not-compress state 318, and duration 332 satisfies duration threshold 334, then the compression state changes to the testing state 314 as illustrated by transition arrow 422. In the testing state 314, data packets of a particular data flow 210 may be compressed, and at some point the compression state may change to either compress state 316 or do-not-compress state 318. For example, if the level of compression of data flow 216 satisfies a first threshold 234, then testing state 314 changes to the compress state 316 as illustrated by transition arrow 426. On the other hand, if during testing state 314, the level of compression of data flow 216 fails to satisfy a first threshold 234, then testing state 314 changes to the do-not-compress state 318 as illustrated by transition arrow 424. Moreover, during the compress state 428, data packets of a particular data flow 210 may be compressed, and at some point the compression state may change to do-not-compress state 318. For example, if the level of compression of data flow 216 fails to satisfy a first threshold 234, then compress state 316 changes to the do-not-compress state 318 as illustrated by transition arrow 428.

FIG. 6B illustrates a conceptual diagram 440 of the relationship between the compression state 442 (corresponding to compression state 312) and time 444 at which each compression state occurs. For example, compression state of one of the multiple data flows 210 (FIG. 2) may be initially set at a testing state 314*a*. At some point in time, testing state 314*a* may change to do-not-compress state 318*a*. The duration 446 is initially set to a default value until the compression state changes to testing state 314*b*. Subsequently, as testing state 314*b* changes to do-not-compress state 318*b*, duration 448 is increased, so that processing resources are not wasted for a data flow that repeatedly fails to reach a compress state 316. As such, as the compression state changes to 314*c*, and subsequently to do-not-compress state 318*c*, the amount of time before the compression state changes to testing state 314*d* is increased to duration 450.

FIG. 6C illustrates another conceptual diagram 452 of the relationship between the compression state 442 (corresponding to compression state 312) and time 444 at which each compression state occurs. For example, compression state of one of the multiple data flows 210 (FIG. 2) may be initially set at a testing state 314*a*. At some point in time, testing state 314*a* may change to do-not-compress state 318*a*. The duration 454 is initially set to a default value until the compression state changes to testing state 314*b*. Subsequently, as testing state 314*b* changes to do-not-compress state 318*b*, duration 448 is increased, so that processing resources are not wasted for a data flow that repeatedly fails to reach a compress state 316. As such, as the compression state changes to 314*c*, and subsequently to compress state 316*a*, the subsequent duration for do-not-compress states 318*c* is reset to its default value, duration 454. Therefore, the amount of time 444 before the compression state changes to testing state 314*d* corresponds to duration 454, which is the same as the duration for do-not-compress state 318*a*.

Figure 7:
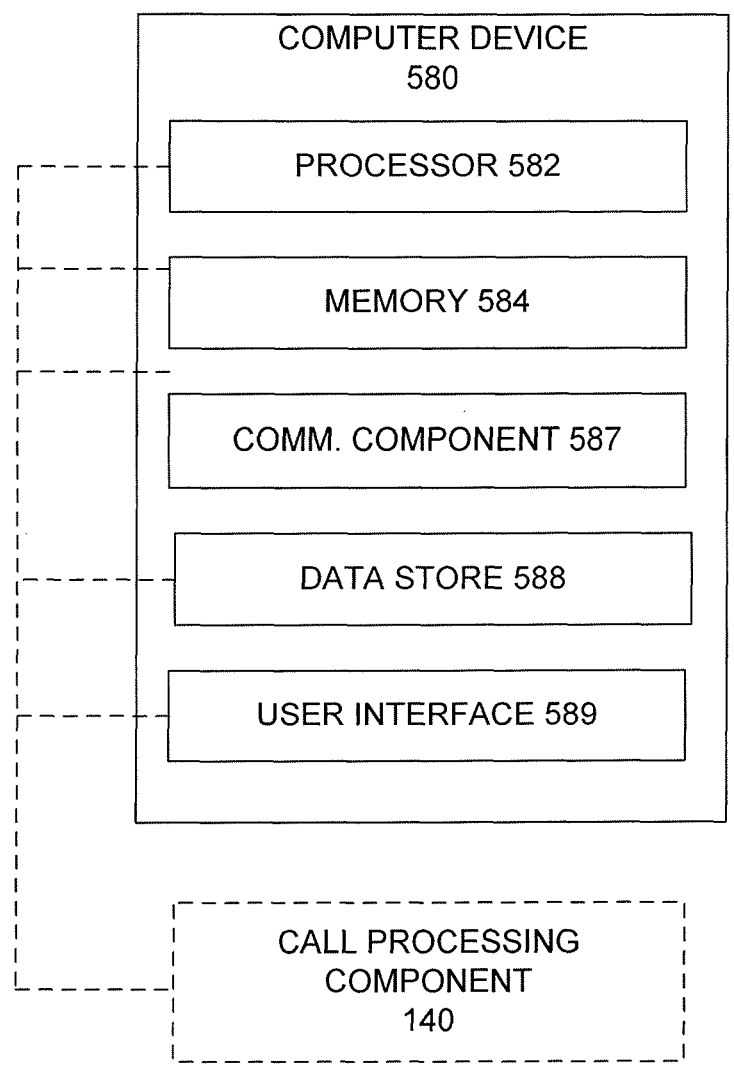
FIG. 7 is a block diagram of one aspect of additional components of a computer device implementing a call processing component according to the present disclosure.

Referring to FIG. 7, in one aspect, UE 114 and/or wireless serving node 116 of FIGS. 1 and 2 may be implemented by a specially programmed or configured computer device 580, wherein the special programming or configuration includes call processing component 140, as described herein. For example, for implementation as UE 114 (FIGS. 1 and 2), computer device 580 may include one or more components for computing and transmitting a data from a UE 114 to network 112 via wireless serving node 116, such as in specially programmed computer readable instructions or code, firmware, hardware, or some combination thereof. Computer device 580 includes a processor 582 for carrying out processing functions associated with one or more of components and functions described herein. Processor 582 can include a single or multiple set of processors or multi-core processors. Moreover, processor 582 can be implemented as an integrated processing system and/or a distributed processing system.

Computer device 580 further includes a memory 584, such as for storing data used herein and/or local versions of applications being executed by processor 582. Memory 584 can include any type of memory usable by a computer, such as random access memory (RAM), read only memory (ROM), tapes, magnetic discs, optical discs, volatile memory, non-volatile memory, and any combination thereof.

Further, computer device 580 includes a communications component 586 that provides for establishing and maintaining communications with one or more parties utilizing hardware, software, and services as described herein. Communications component 586 may carry communications between components on computer device 580, as well as between computer device 580 and external devices, such as devices located across a communications network and/or devices serially or locally connected to computer device 580. For example, communications component 586 may include one or more buses, and may further include transmit chain components and receive chain components associated with and including a transmitter and receiver, respectively, or a transceiver, operable for interfacing with external devices.

Additionally, computer device 580 may further include a data store 588, which can be any suitable combination of hardware and/or software, that provides for mass storage of information, databases, and programs employed in connection with aspects described herein. For example, data store 588 may be a data repository for applications not currently being executed by processor 582.

Computer device 580 may additionally include a user interface component 589 operable to receive inputs from a user of computer device 580, and further operable to generate outputs for presentation to the user. User interface component 589 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 589 may include one or more output devices, including but not limited to a display, a speaker, a haptic feedback mechanism, a printer, any other mechanism capable of presenting an output to a user, or any combination thereof.

Furthermore, computer device 580 may include, or may be in communication with, call processing component 140, which may be configured to perform the functions described herein.

Figure 8:
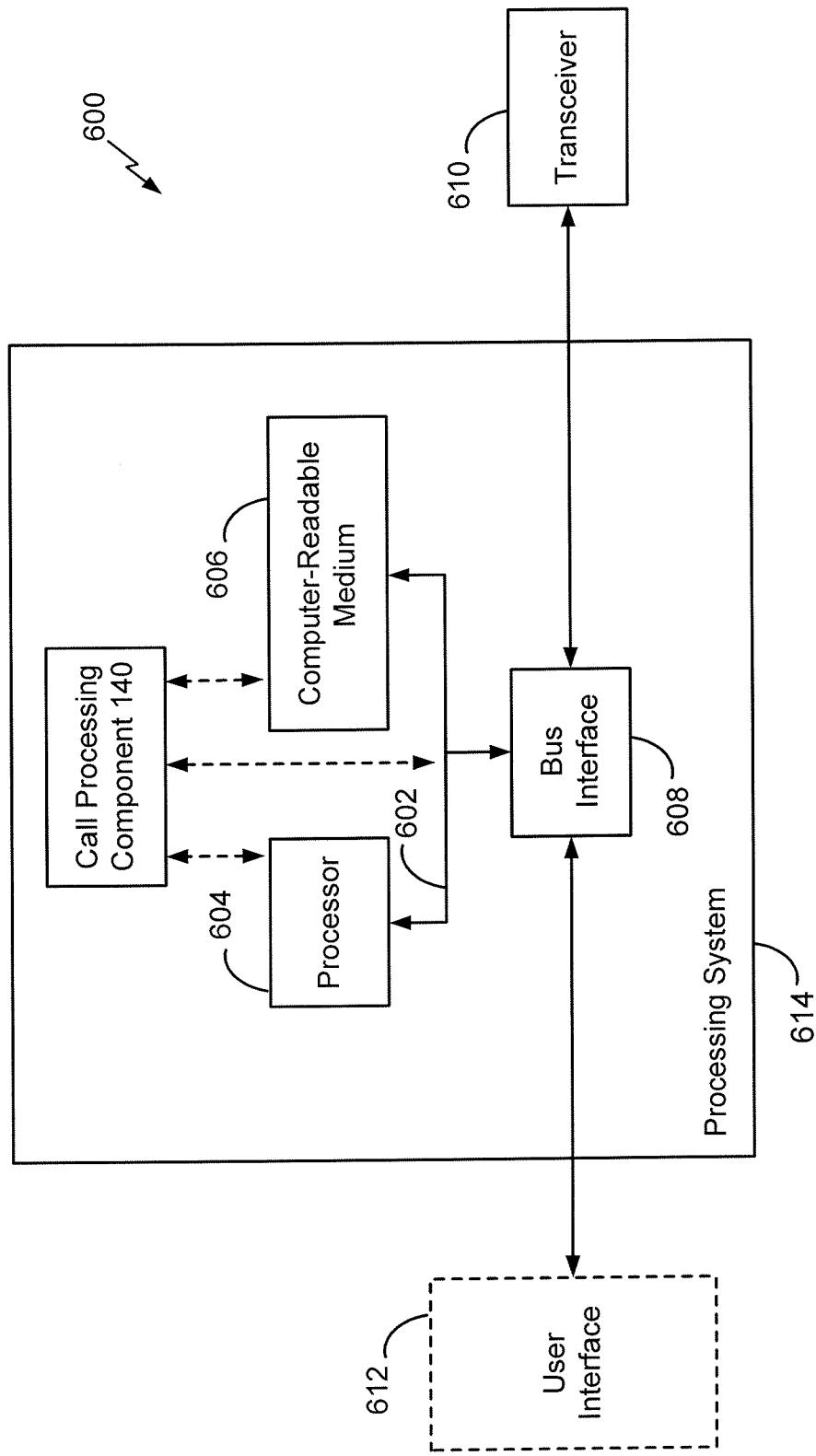
FIG. 8 is a block diagram of an aspect of a hardware implementation for an apparatus employing a processing system to perform the functions described herein.

Referring to FIG. 8, in one aspect, an example of a hardware implementation for an apparatus 600 may employ a processing system 614 configured to include call processing component 140 and compressor component 145 (FIGS. 1 and 2) implementing the functions described above. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

In an aspect, processor 604, computer-readable medium 606, or a combination of both may be configured or otherwise specially programmed to perform the functionality of the call processing component 140 and/or compressor component 145 (FIGS. 1 and 2) as described herein.

The various concepts presented throughout this disclosure may be implemented across a broad variety of telecommunication systems, network architectures, and communication standards.

Figure 9:
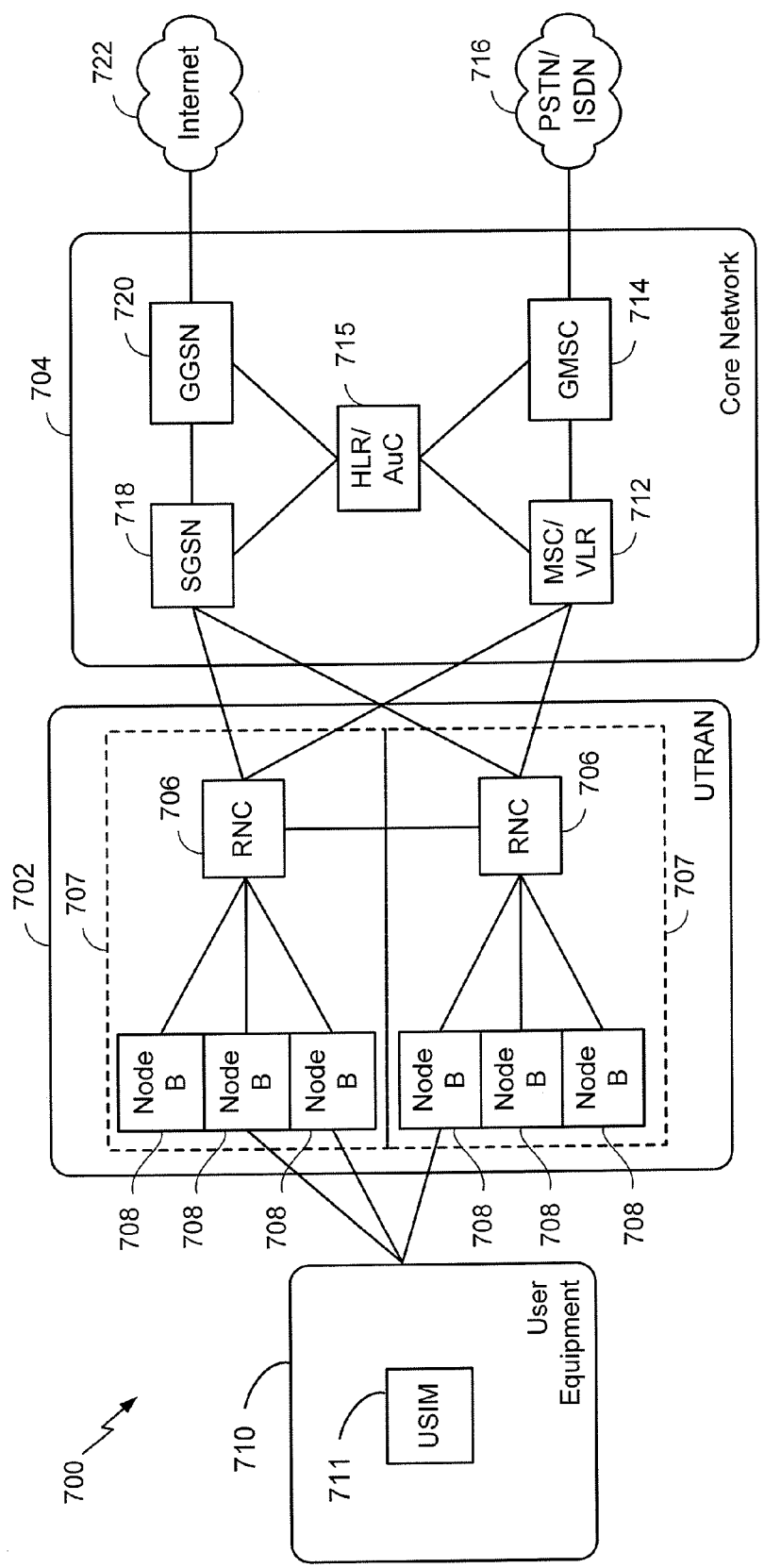
FIG. 9 is a block diagram conceptually illustrating an example of a telecommunications system including a UE configured to perform the functions described herein.

Referring to FIG. 9, by way of example and without limitation, the aspects of the present disclosure are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. UE 710 may be configured to include, for example, the call processing component 140 and/or compressor component 145 (FIGS. 1 and 2) implementing the functions described above. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 710 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate, or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
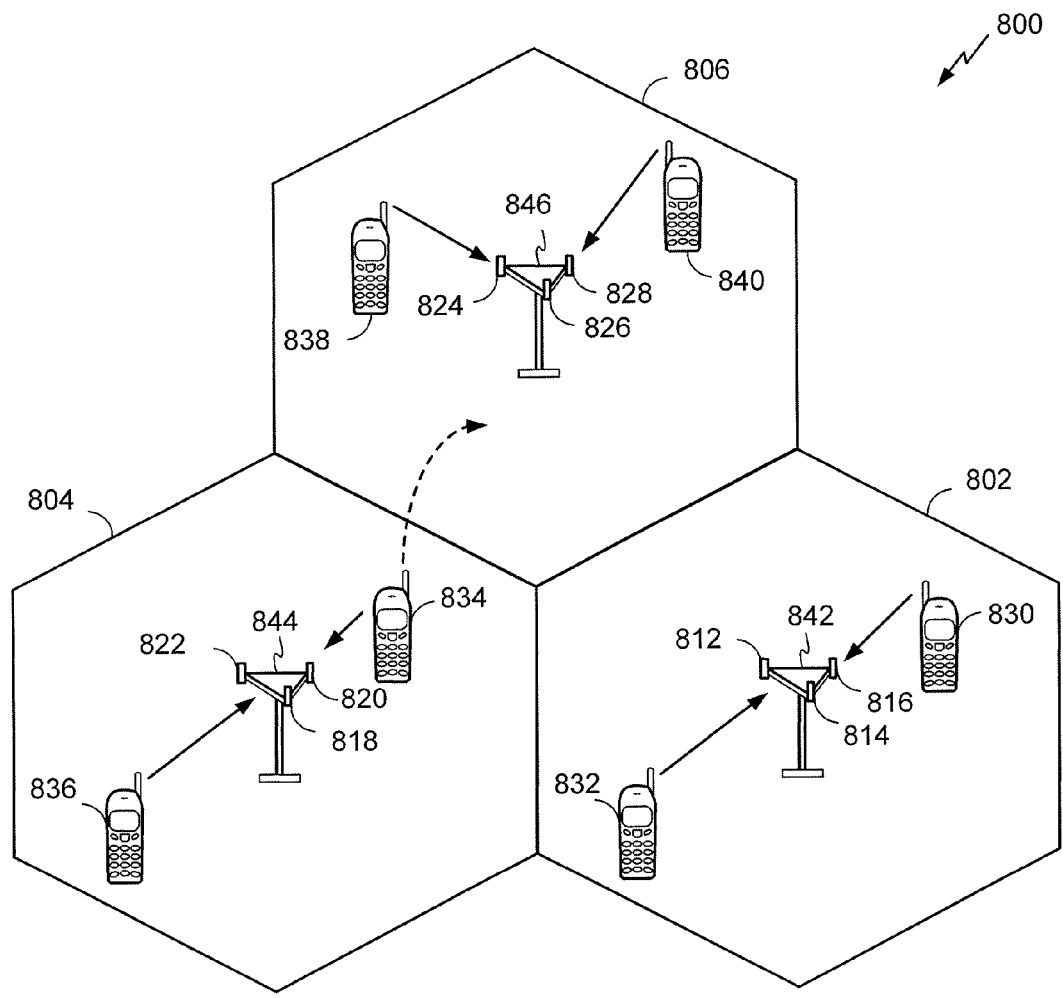
FIG. 10 is a conceptual diagram illustrating an example of an access network for use with a UE configured to perform the functions described herein.

Referring to FIG. 10, an access network 800 in a UTRAN architecture includes multiple cellular regions (cells) in which a UE including call processing component 140 and/or compressor component 145 (FIGS. 1 and 2) may operate and perform the functions described herein. The cellular regions of access network 800 include cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 904 (see FIG. 9) for all the UEs 830, 832, 834, 836, 838, 840 in the respective cells 802, 804, and 806. Node Bs 842, 844, 846 and UEs 830, 832, 834, 836, 838, 840 respectively may be configured to include, for example, the call processing component 140 and/or compressor component 145 (FIGS. 1 and 2) implementing the functions described above.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 9), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 11.

Figure 11:
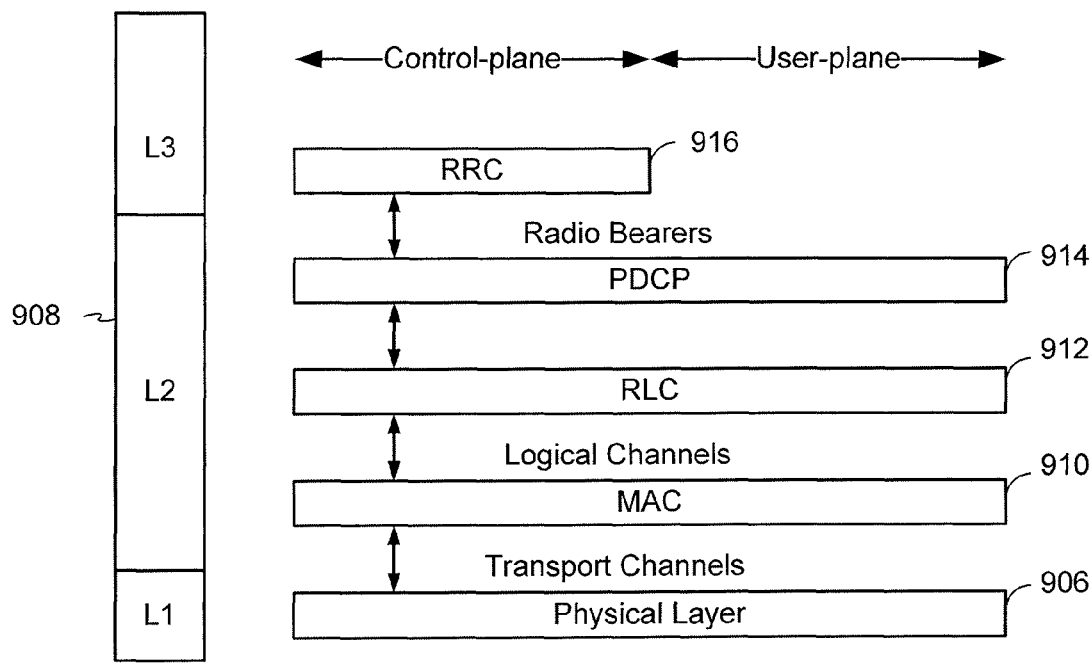
FIG. 11 is a conceptual diagram illustrating an example of a radio protocol architecture for the user and control planes for a base station and/or a UE configured to perform the functions described herein.

Referring to FIG. 11, an example of the radio protocol architecture 900 for the user plane 902 and the control plane 904 may be included in a network entity and/or UE such as an entity within network 112 and/or UE 114 (FIGS. 1 and 2). The radio protocol architecture 900 for the UE and node B is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and node B over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between node Bs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 12:
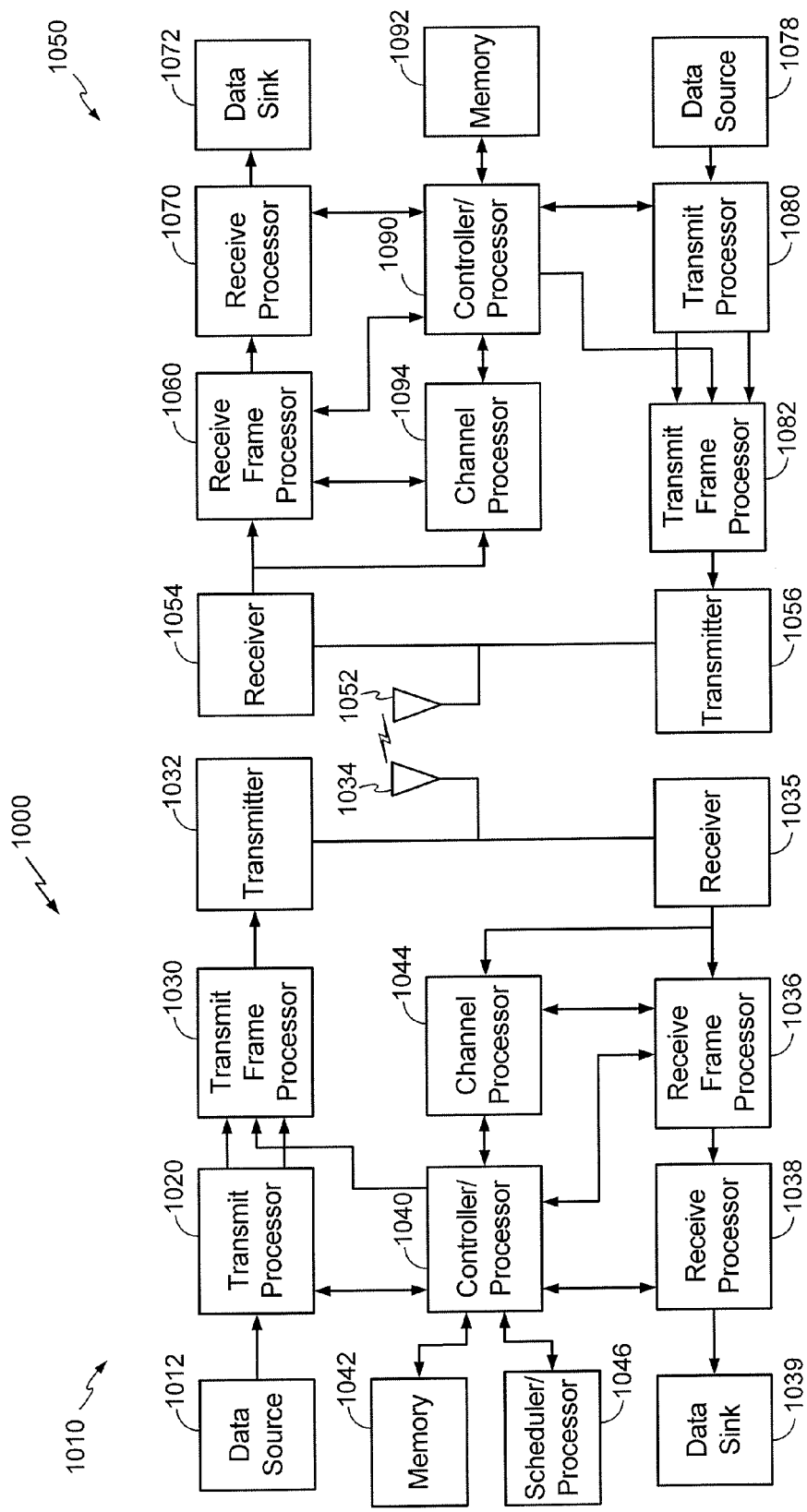
FIG. 12 is a block diagram conceptually illustrating an example of a Node B in communication with a UE in a telecommunications system configured to perform the functions described herein.

Referring to FIG. 12, a communication system 1000 includes a Node B 1010 in communication with a UE 1050, where Node B 1010 may be wireless serving node 116 or an entity within network 112 and the UE 1050 may be UE 114 having call processing component 140 and/or compressor component 145 according to the aspects described in FIGS. 1 and 2. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 5 or 6) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606 (FIG. 8). The computer-readable medium 606 (FIG. 8) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of compression on multiple data flows for communication between a user equipment (UE) and a serving node, comprising:
    receiving multiple data flows for compression, wherein each of the multiple data flows includes a plurality of data packets, with each data packet having a data packet header and a payload;
    determining a compression state for each of the multiple data flows;
    performing a first compression algorithm on each of the multiple data flows determined to have a compression state set to a do-not-compress state, wherein the first compression algorithm includes compressing the data packet header of each data packet without compressing the payload of each data packet;
    determining a duration corresponding to at least one or both of an amount of time the compression state is set to the do-not-compress state and a number of packets compressed during the do-not-compress state for each of the multiple data flows;
    changing the compression state to a testing state on each of the multiple data flows in response to determining that the duration exceeded a duration threshold; and
    performing a second compression algorithm on each of the multiple data flows with the compression state set to a testing state.

2. The method of claim 1, wherein performing the first compression algorithm on each of the multiple data flows further comprises setting a filtered compression percentage for each of the multiple data flows, wherein the filtered compression percentage corresponds to a level of compression on each of the multiple data flows.

3. The method of claim 2, wherein the level of compression on each of the multiple data flows corresponds to a level of compression of the payload of each data packet.

4. The method of claim 1, wherein performing the second compression algorithm on each of the multiple data flows further comprises:
    initializing a filtered compression percentage to a default value on each of the multiple data flows, wherein the filtered compression percentage corresponds to a level of compression on each of the multiple data flows;
    compressing one or more data packets on each of the multiple data flows;
    updating the filtered compression percentage on each of the multiple data flows as each of the one or more data packets are compressed;
    comparing the filtered compression percentage on each of the multiple data flows to a compression threshold for each of the multiple data flows; and
    determining whether to change the compression state on each of the multiple data flows based on the comparison.

5. The method of claim 4, wherein the level of compression on each of the multiple data flows corresponds to a level of compression of the payload of each data packet.

6. The method of claim 4, wherein determining whether to change the compression state on each of the multiple data flows based on the comparison further comprises:
    changing the compression state to a compress state when the filtered compression percentage satisfies the compression threshold; and
    changing the compression state to the do-not-compress state when the filtered compression percentage does not satisfy the compression threshold.

7. The method of claim 6, further comprising increasing the duration threshold when the compression state is changed to the do-not-compress state, wherein the duration threshold is increased either linearly or exponentially.

8. The method of claim 6, further comprising resetting the duration threshold to an initial duration threshold value when the compression state changes to the compress state.

9. The method of claim 6, wherein changing the compression state to the compress state further comprises:
    compressing one or more data packets on each of the multiple data flows;
    updating the filtered compression percentage on each of the multiple data flows as each of the one or more data packets are compressed;
    comparing the filtered compression percentage on each of the multiple data flows to the compression threshold; and
    determining whether to change the compression state on each of the multiple data flows based on the comparison.

10. The method of claim 9, wherein determining whether to change the compression state on each of the multiple data flows based on the comparison further comprises:
    changing the compression state to the do-not-compress state when the filtered compression percentage does not satisfy the compression threshold; and
    continuing to compress the one or more data packets on each of the multiple data flows when the filtered compression percentage satisfies the compression threshold.

11. The method of claim 6, wherein comparing the filtered compression percentage to the compression threshold occurs when a threshold number of the one or more data packets are compressed.

12. The method of claim 1, wherein performing the first compression algorithm on each of the multiple data flows further comprises updating a memory of the compressor with the data packet header of each data packet.

13. An apparatus for compression on multiple data flows for communication between a user equipment (UE) and a serving node, comprising:
   means for receiving multiple data flows for compression, wherein each of the multiple data flows includes a plurality of data packets, with each data packet having a data packet header and a payload;
   means for determining a compression state for each of the multiple data flows;
   means for performing a first compression algorithm on each of the multiple data flows determined to have a compression state set to a do-not-compress state, wherein the first compression algorithm includes compressing the data packet header of each data packet without compressing the payload of each data packet;
   means for determining a duration corresponding to at least one or both of an amount of time the compression state is set to the do-not-compress state and a number of packets compressed during the do-not-compress state for each of the multiple data flows;
   means for changing the compression state to a testing state on each of the multiple data flows in response to determining that the duration exceeded a duration threshold; and
   means for performing a second compression algorithm on each of the multiple data flows with the compression state set to a testing state.

14. An apparatus for compression on multiple data flows for communication between a user equipment (UE) and a serving node, comprising:
   a memory that stores instructions; and
   at least one processor coupled with the memory, wherein the at least one processor and the memory are configured to:
      receive multiple data flows for compression, wherein each of the multiple data flows includes a plurality of data packets, with each data packet having a data packet header and a payload;
      determine a compression state for each of the multiple data flows;
      perform a first compression algorithm on each of the multiple data flows determined to have a compression state set to a do-not-compress state, wherein the first compression algorithm includes compressing the data packet header of each data packet without compressing the payload of each data packet;
      determine a duration corresponding to at least one or both of an amount of time the compression state is set to the do-not-compress state and a number of packets compressed during the do-not-compress state for each of the multiple data flows;
      change the compression state to a testing state on each of the multiple data flows in response to determining that the duration exceeded a duration threshold; and
      perform a second compression algorithm on each of the multiple data flows with the compression state set to a testing state.

15. The apparatus of claim 14, wherein to perform the first compression algorithm the at least one processor and the memory are further configured to set a filtered compression percentage for each of the multiple data flows, wherein the filtered compression percentage corresponds to a level of compression on each of the multiple data flows.

16. The apparatus of claim 15, wherein the level of compression on each of the multiple data flows corresponds to a level of compression of the payload of each data packet.

17. The apparatus of claim 15, wherein the at least one processor and the memory configured to perform the second compression algorithm are further configured to:
   initialize a filtered compression percentage to a default value on each of the multiple data flows, wherein the filtered compression percentage corresponds to a level of compression on each of the multiple data flows;
   compress one or more data packets on each of the multiple data flows;
   update the filtered compression percentage on each of the multiple data flows as each of the one or more data packets are compressed;
   compare the filtered compression percentage on each of the multiple data flows to a compression threshold for each of the multiple data flows; and
   determine whether to change the compression state on each of the multiple data flows based on the comparison.

18. The apparatus of claim 17, wherein the level of compression on each of the multiple data flows corresponds to a level of compression of the payload of each data packet.

19. The apparatus of claim 17, wherein the at least one processor and the memory configured to determine whether to change the compression state are further configured to:
   change the compression state to a compress state when the filtered compression percentage satisfies the compression threshold; and
   change the compression state to the do-not-compress state when the filtered compression percentage does not satisfy the compression threshold.

20. The apparatus of claim 19, wherein the at least one processor and the memory are further configured to increase the duration threshold when the compression state is changed to the do-not-compress state, and wherein the duration threshold is increased either linearly or exponentially.

21. The apparatus of claim 19, wherein the at least one processor and the memory are further configured to reset the duration threshold to an initial duration threshold value when the compression state changes to the compress state.

22. The apparatus of claim 19, wherein the at least one processor and the memory configured to change the compression state to the compress state are further configured to:
   compress one or more data packets on each of the multiple data flows;
   update the filtered compression percentage on each of the multiple data flows as each of the one or more data packets are compressed;
   compare the filtered compression percentage on each of the multiple data flows to the compression threshold; and
   determine whether to change the compression state on each of the multiple data flows based on the comparison.

23. The apparatus of claim 22, wherein the at least one processor and the memory configured to determine whether to change the compression state are further configured to:
   change the compression state to the do-not-compress state when the filtered compression percentage does not satisfy the compression threshold; and
   continue to compress the one or more data packets on each of the multiple data flows when the filtered compression percentage satisfies the compression threshold.

24. The apparatus of claim 19, wherein the at least one processor and the memory are configured to compare the filtered compression percentage to the compression threshold occurs when a threshold number of the one or more data packets are compressed.

25. The apparatus of claim 14, wherein the at least one processor and the memory configured to perform the first compression algorithm are further configured to update a memory of the compressor with the data packet header of each data packet.

26. A non-transitory computer-readable medium storing computer executable code for compression on multiple data flows for communication between a user equipment (UE) and a serving node, comprising:
- code for receiving multiple data flows for compression, wherein each of the multiple data flows includes a plurality of data packets, with each data packet having a data packet header and a payload;
- code for determining a compression state for each of the multiple data flows;
- code for performing a first compression algorithm on each of the multiple data flows determined to have a compression state set to a do-not-compress state, wherein the first compression algorithm includes compressing the data packet header of each data packet without compressing the payload of each data packet;
- code for determining a duration corresponding to at least one or both of an amount of time the compression state is set to the do-not-compress state and a number of packets compressed during the do-not-compress state for each of the multiple data flows;
- code for changing the compression state to a testing state on each of the multiple data flows in response to determining that the duration exceeded a duration threshold; and
- code for performing a second compression algorithm on each of the multiple data flows with the compression state set to a testing state.

* * * * *